US011818373B1

(12) United States Patent
Mama et al.

(10) Patent No.: US 11,818,373 B1
(45) Date of Patent: Nov. 14, 2023

(54) MACHINE-LEARNING BASED DATA COMPRESSION FOR STREAMING MEDIA

(71) Applicant: Block, Inc., San Francisco, CA (US)

(72) Inventors: Rayhane Mama, San Francisco, CA (US); Marc Tyndel, San Francisco, CA (US); Ragavan Thurairatnam, San Francisco, CA (US)

(73) Assignee: Block, Inc., Oakland, CA (US)

( * ) Notice: Subject to any disclaimer, the term of this patent is extended or adjusted under 35 U.S.C. 154(b) by 147 days.

(21) Appl. No.: 17/014,929

(22) Filed: Sep. 8, 2020

(51) Int. Cl.
*H04N 19/40* (2014.01)
*H04N 7/15* (2006.01)
*G06N 20/00* (2019.01)
*G06N 3/045* (2023.01)

(52) U.S. Cl.
CPC .............. *H04N 19/40* (2014.11); *G06N 3/045* (2023.01); *G06N 20/00* (2019.01); *H04N 7/15* (2013.01)

(58) Field of Classification Search
CPC ........ H04N 19/40; H04N 7/15; G06N 3/0454; G06N 20/00
See application file for complete search history.

(56) References Cited

U.S. PATENT DOCUMENTS

| | | | |
|---|---|---|---|
| 10,419,773 B1* | 9/2019 | Wei | H04N 19/46 |
| 10,482,887 B1* | 11/2019 | Jha | G10L 19/0018 |
| 10,581,625 B1* | 3/2020 | Pandey | H04N 7/147 |
| 10,929,392 B1* | 2/2021 | Cheng | G06N 3/08 |
| 10,998,101 B1* | 5/2021 | Tran | A61B 5/486 |
| 11,231,779 B1* | 1/2022 | Sundberg | G06F 1/1686 |
| 11,281,293 B1* | 3/2022 | Hernández | G06F 3/015 |
| 11,283,670 B2* | 3/2022 | Xuan | H04L 67/02 |
| 2012/0143605 A1* | 6/2012 | Thorsen | G10L 15/183 704/235 |
| 2014/0279745 A1* | 9/2014 | Esponda | G06N 5/043 706/12 |
| 2018/0176576 A1* | 6/2018 | Rippel | G06N 3/0455 |
| 2019/0066313 A1* | 2/2019 | Kim | G06T 7/248 |
| 2019/0141292 A1* | 5/2019 | Thakkar | H04L 12/1818 |
| 2019/0189022 A1* | 6/2019 | Kokku | G06F 16/252 |
| 2019/0251401 A1* | 8/2019 | Shechtman | G06V 10/82 |
| 2019/0327490 A1* | 10/2019 | Kanoh | H04N 19/176 |
| 2019/0333505 A1* | 10/2019 | Stavisky | A61B 5/741 |
| 2019/0392266 A1* | 12/2019 | Zhong | H04L 65/762 |
| 2020/0036544 A1* | 1/2020 | Suhail | G06Q 10/1093 |
| 2020/0045163 A1* | 2/2020 | Hwang | H04M 1/72451 |
| 2020/0053591 A1* | 2/2020 | Prasad | H04N 21/238 |
| 2020/0097389 A1* | 3/2020 | Smith | G06F 11/0793 |
| 2020/0186796 A1* | 6/2020 | Mukherjee | H04N 19/593 |

(Continued)

*Primary Examiner* — Joseph Suh
(74) *Attorney, Agent, or Firm* — Lee & Hayes, P.C.

(57) ABSTRACT

Technology to encode/compress and decode/uncompress video streams is described. According to one example, a computer-implemented method includes receiving, by a server and from a first device associated with a first participant of a videoconference involving a second device associated with a second participant, a first compressed video stream and a first decoding model. The first decoding model is trained via machine learning, and the first compressed video stream is compressed using a first encoding model trained via machine learning. The first encoding and decoding models are customized to the first participant. The server is adapted to transmit to the second device, the first decoding model and the first compressed video stream.

20 Claims, 11 Drawing Sheets

(56) References Cited

U.S. PATENT DOCUMENTS

| | | | |
|---|---|---|---|
| 2020/0195934 A1* | 6/2020 | Xing | H04N 19/154 |
| 2020/0211678 A1* | 7/2020 | Foley | G16H 10/60 |
| 2020/0244639 A1* | 7/2020 | Arif Khan | G06N 20/10 |
| 2020/0273575 A1* | 8/2020 | Wolf | G06Q 10/063112 |
| 2020/0351435 A1* | 11/2020 | Therkelsen | H04N 7/155 |
| 2020/0357389 A1* | 11/2020 | Bai | G10L 15/30 |
| 2020/0382791 A1* | 12/2020 | Ivanovic | H04N 19/197 |
| 2021/0065683 A1* | 3/2021 | Meng | G10L 15/063 |
| 2021/0092403 A1* | 3/2021 | Hsu | H04N 19/132 |
| 2021/0104063 A1* | 4/2021 | Kassis | G06F 3/0304 |
| 2021/0112283 A1* | 4/2021 | Orihashi | H04N 19/17 |
| 2021/0152831 A1* | 5/2021 | Liu | H04N 19/136 |
| 2021/0256346 A1* | 8/2021 | Desoli | G06F 18/217 |
| 2021/0306513 A1* | 9/2021 | Terada | H04N 1/32149 |
| 2021/0312689 A1* | 10/2021 | Akhoundi | G06T 19/20 |
| 2021/0354704 A1* | 11/2021 | Simoncini | G06V 20/56 |
| 2021/0361208 A1* | 11/2021 | Lee | A61B 5/165 |
| 2021/0369163 A1* | 12/2021 | Hu | A61B 5/7275 |
| 2021/0375008 A1* | 12/2021 | Hassan | H04N 19/20 |
| 2021/0398011 A1* | 12/2021 | Hsu | G06F 40/30 |
| 2021/0405825 A1* | 12/2021 | Narayanan | G06N 20/00 |
| 2021/0406369 A1* | 12/2021 | Healy | G06N 5/04 |
| 2021/0409316 A1* | 12/2021 | Seshan | H04L 45/42 |
| 2022/0007437 A1* | 1/2022 | Goenka | H04L 67/141 |
| 2022/0035724 A1* | 2/2022 | Strein | H04L 41/12 |
| 2022/0067500 A1* | 3/2022 | Choque | G06N 3/08 |

\* cited by examiner

US 11,818,373 B1

MACHINE-LEARNING BASED DATA COMPRESSION FOR STREAMING MEDIA

BACKGROUND

With the generally improved processing capacity not only in computers but also in hand-held devices such as tablets and smart phones, and general accessibility to the Internet, information is often exchanged now-a-days in the form of video. Raw video data tends to be very large (on the order of several megabytes, hundreds of megabytes, etc.) and, as such, video data is rarely transmitted and/or stored in the raw form. Rather, a video is encoded and compressed. Video compression generally involves transforming raw frames of video data into a bitstream that is typically orders of magnitude smaller in size than the original raw stream, measured in bits/bytes of data, while preserving an adequate representation of the original video. Such video compression is usually lossy, and is used commonly both in storage and transmission of video data.

In many video coding standards such as H. 264, H. 265, VP9, etc., a frame in the video typically undergoes the following four major operations:

(1) Partitioning of the pixels of a frame into blocks.
(2) Prediction of blocks, which can be intra-frame and/or inter-frame. In intra-frame prediction, for a block to be encoded, a matching block (called a reference block) within the same frame, where the match is determined according to a selected similarity measure, is identified. In inter-frame prediction, a matching block from a different frame is identified.
(3) Residual computation. In residual computation, a difference between the block to be encoded (also called the prediction block) and the corresponding reference block is computed.
(4) Quantization and encoding. Here, the residual is quantized and the quantized values are encoded, yielding a compressed encoded representation of the prediction block, which can be stored and/or transmitted.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
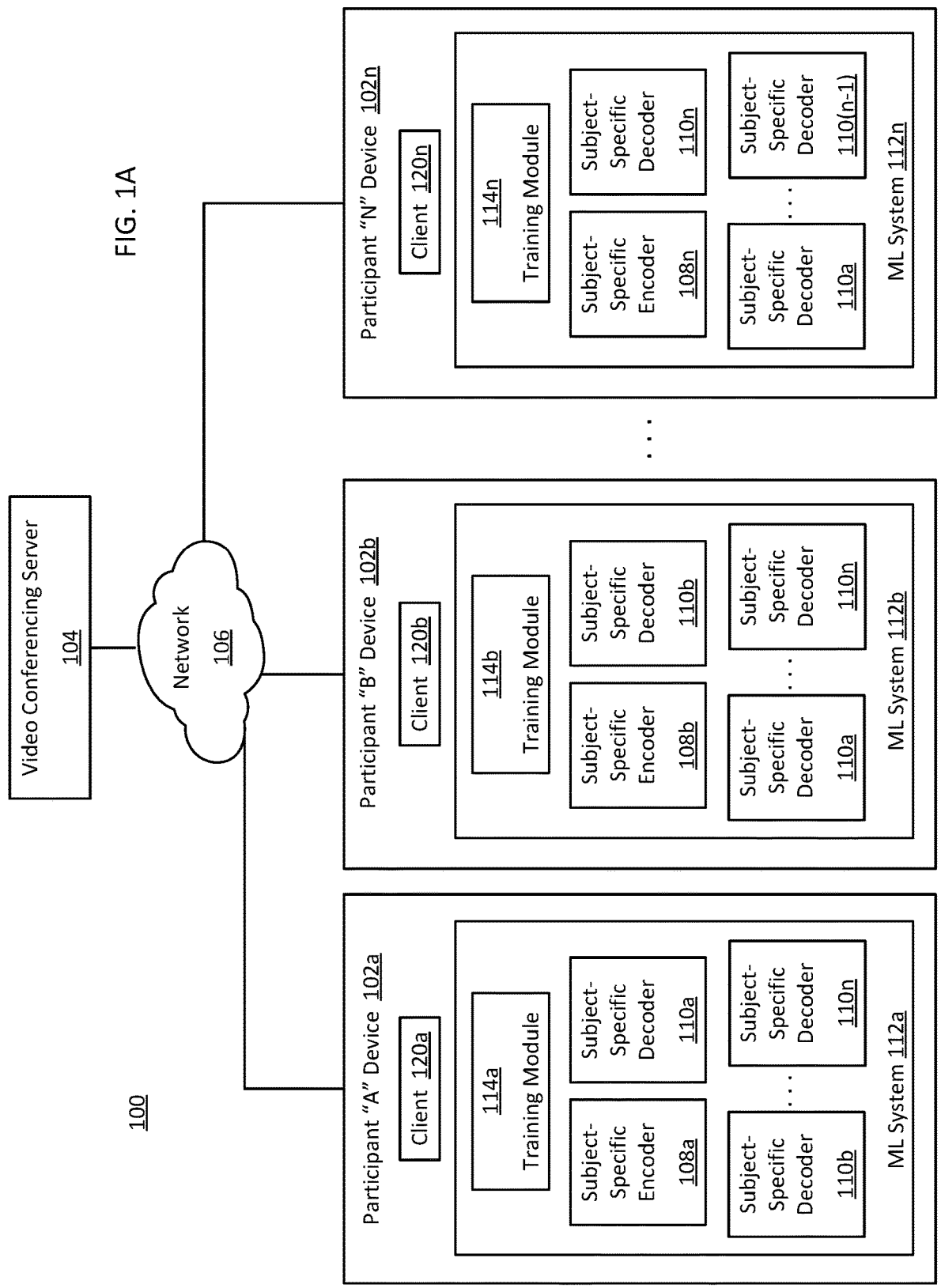
FIGS. 1A and 1B schematically depict two cloud-based video conferencing environments, according to two different examples.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Video transmissions can be broadly classified into two categories, namely, stored video transmission and live streaming. Stored video transmission can be used to transmit videos that are produced at one time and are transmitted and viewed at a later time. Examples of such videos include movies, previously recorded TV shows, previously recorded sports events, etc. In live streaming, on the other hand, production, transmission, reception, and display of the video occur in real time. Examples of live streaming include video chats, video conferences, live customer support, live shopping events, live social media feeds, live infomercials, live transmission of news, etc.

One main difference between stored video transmission and live streaming is the availability of buffering in the former, and lack thereof in the latter. Videos are generally produced and displayed at a constant frame rate such as 24 frames per second (fps), 30 fps, 60 fps, etc. When the entire video to be transmitted, or at least a portion thereof, is available prior to transmission and display thereof, the video can be transmitted at a different frame rate than the rate at which it would be displayed upon reception. Unlike the display rate, which is constant, the transmission rate for stored video can be varied using a storage buffer at the receiver.

In particular, when relatively high bandwidth is available for transmission, the frames can be transmitted at a rate greater than the constant rate of display. For example, for a display rate of 30 fps, frames can be transmitted at 35 fps, 40 fps, 42 fps, etc. At the receiver, the faster arriving frames are buffered. When the available bandwidth is relatively low, frames can be transmitted at a rate less than the display rate, such as, for example, 28 fps, 20 fps, 18 fps, etc. In this case, the previously received frames are extracted from the buffer so that the frames can still be displayed at the selected constant rate. Thus, the use of a buffer allows adjusting the rate of transmission of frames according to the available bandwidth.

This further allows performing encoding and compression of the video to be transmitted such that the compression ratio, i.e., the ratio of the size of a raw frame and the size of the corresponding encoded frame, is independent of the available bandwidth, although, many video encoding standards do allow for adjusting the compression ratio according to the available bandwidth. In general, the greater the compression ratio, the lesser the required transmission bit rate and the required bandwidth but also the lesser the perception quality of the video. Conversely, the lesser the compression ratio, the greater the perception quality of the video but also the greater the required bit rate and the required bandwidth.

As such, when the available bandwidth this low, according to the standard encoding schemes, the compression ratio can be increased, but this can decrease the perception quality of the video. When buffering is used, however, video frames can be transmitted at a slower rate, i.e., at a rate less than the frame display rate. As such, the compression ratio need not be increased so as to affect negatively the perception quality of the video. Buffering thus enables maintaining a desired perception quality regardless of the available bandwidth.

Buffering is not available, however, in live streaming where the video is produced, transmitted, received, and displayed, in real time. As such, regardless of the available bandwidth, video frames must be transmitted at the same constant rate at which they are produced and displayed. Therefore, in using the conventional, standard encoding scheme, when the available bandwidth becomes low, the compression ratio for the frames to be transmitted is typically increased, which can lower the perception quality of the video upon its display.

Various examples described herein feature a different encoding and compression scheme that allows for maintaining a high or desired perception quality regardless of the available bandwidth and when buffering is not available, in some types of live streaming. In live streaming events such as video chats, video conferencing, live customer support, live shopping events, live social media feeds, live infomercials, live news streaming, etc., (referred to in the discussion below as video conference or video conferencing), usually one person speaks at a time, though different participants may speak at different times. Typically, the video of the speaker is viewed by one or more participants of the video conference, though the videos of non-speaking participants may be viewed, as well.

The encoding and compression and decoding/reconstruction techniques described herein can be used in various applications. For example, merchants may want to conduct a real-time or live stream shopping experience for remote users or buyers. In these live streaming examples, transmission, reception, and display of the video occur in real-time or near real-time. The user (e.g., a merchant) can post an image, video, or the like (hereinafter "content") via a video conferencing server for receipt by one or more remote users viewing the video conferencing server. Such content can depict item(s) (e.g., goods and/or services) that remote users may be able to interact with and purchase items. In some examples, the content can be associated with an intent to sell an item depicted in the content (e.g., text associated with an image indicating that the user is looking to sell an item depicted in the image, speech associated with a video indicating that the user is looking to sell an item depicted in the video, etc.). The compression techniques of the present embodiments enable seamless, high quality video transmission between the merchant and remote users irrespective of the available bandwidth, especially in cases where the merchant (seller) and/or the potential or actual buyers are participating in the video conference.

The above-described aspects of a video conference are often true in the case of live news streaming, where one person, such as a news co-anchor, a sports reporter, or a weather reporter, speaks at a time, or in the case of live talk-show streaming, where one person, the host of the show or a guest, speaks at a time. Typically, the video that is transmitted focuses on the speaker. The only difference in these types of live streaming events compared to a typical video conference is that the viewers are not the participants themselves.

The standard-based encoders take advantage of the spatial and/or temporal redundancy that is typically present in video data. In general, the video information does not tend to change rapidly from frame to frame, or from pixel to pixel within a frame. Therefore, it is usually possible to find a matching reference block for the block to be encoded based on parts of the video that have been processed previously. If the match is good, the difference between the prediction and reference blocks (also called a residual) can be small and, as such, the residual can be represented (encoded) using much less data (in terms of bits or bytes) than that needed for encoding the actual pixel values in the block to be encoded. This allows for effective compression of the video data.

As described above, standardized video encoding schemes search for similar blocks in a single frame or across different frames, so that transmission of duplicate information can be minimized. This scheme is largely based on identifying spatial and temporal similarities in the video content, but it does not collect or use any other information about the video content. In contrast, the techniques described herein rely on information about the video content other than spatial and temporal similarities; specifically, they rely on information about the speaker that is featured in the video.

In particular, taking advantage of the fact that usually one participant of a video conference speaks at a time and that the video displayed in a main window generally focusses on the speaker and not on the other non-speaking participants (whose videos may also be displayed but typically in smaller sidebar windows and not in the main window), encoding according to the techniques described herein is performed in a participant-specific manner. The participant-specific video encoding takes advantage of the fact that the manner in which a particular speaker speaks, e.g., the speaker's facial expressions, movement of the head and eyes, hand gestures, etc., generally change in a limited manner only. For example, while two different speakers may smile in two very different ways, a particular speaker may smile in generally the same way on different occasions. Likewise, one speaker may rock back-and-forth while speaking, while another speaker may move his or her head from side to side.

In various examples described below, such participant-specific knowledge is learned via machine learning, and that knowledge is used to minimize redundancies in video transmission in addition to (or instead of) spatial and temporal redundancies. This allows for a higher compression ratio than that achieved using standardized encoding schemes. The learned participant-specific knowledge is used in decoding or reconstructing the encoded video as well, so that a high or desired perception quality can be maintained despite the higher compression ratio. Since the compression ratio is generally higher relative to standardized encoding, the frame rate of video transmission need not be lowered when the available bandwidth is low. Thus, examples described herein improves video transmission of prior solutions by maintaining a high or desired perception quality video conferencing even when buffering (to accommodate variable frame transmission rates) is unavailable.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1A schematically depicts a cloud-based video conferencing environment 100, in which several participants "A," "B," etc., up to participant "N" can communicate with each other by exchanging video and other information. The number N can be any number such as 2, 5, 8, 20, 40, etc. Each of the N participants uses his or her own device, e.g., user devices 102a, 102b, . . . , 102n. A particular user device can be a desktop or a laptop computer, a tablet, a smartphone, or another smart device having a display, a camera, and one or more speakers. The participating user devices (collectively 102) communicate with a video conferencing server 104 via a network 106 which can be the Internet, a public network, a proprietary network, or a secured network formed over a public network or the Internet.

The videoconferencing server 104 receives video, audio, and other transmissions from each of the participating devices 102. From the received audio signals, the server 104 can determine the participant speaking at a particular instance of time, and multicasts the video signals received from that participant to the other participants. Additionally, the server 104 may multicast the video signals received from one or more non-speaking participants to the other participants. In a conventional video conferencing environment, the user devices typically include standardized video encoders/decoders, e.g., H. 264, H. 265, VP9, etc. In the environment 100, however, one or more user devices 102 use respective encoders that are customized, using machine learning, for the respective participants using those devices. In addition, a user device may also use one or more decoders, each of which is customized for a respective participant of the video conference.

In particular, the user device 102a includes an encoder 108a and a decoder 110a, each of which is customized for the user of the device 102a, i.e., Participant "A." The user device 102a also includes one or more additional decoders, e.g., 110b, 110n, that are customized for other participants, e.g., Participant B and Participant N, respectively. Likewise, the user device 102b includes an encoder 108b and a decoder 110b, each of which is customized for the user of the device 102b, i.e., Participant "B." The user device 102b may also include one or more additional decoders, e.g., 110a, 110n, that are customized for other participants, e.g., Participant A and Participant N, respectively. In addition, or in the alternative, some user devices include standardized video encoders/decoders. Each of the devices 102 (e.g., 102a, 102b, . . . , 102n) includes a respective client module 120 (e.g., 102a, 102b, . . . , 102n) to exchange video and other information with the server 104.

In order to have a customized encoder (also referred to as subject-specific encoder) and one or more customized decoders (also referred to as subject-specific decoders), a user device (e.g., the device 102a) includes a machine-learning (ML) system 112a, that includes a training module 114a. The video conferencing server 104 may provide the type and/or subtype of the ML systems 112a, 112b, . . . , 112n to the devices 102a, 102b, . . . , 102n. Typically, but not necessarily, the ML systems 102a, 102b, . . . , 102N are instances of a single type of an ML system, where such instances can be trained to provide a subject-specific encoder and one or more subject-specific decoders.

The video conferencing server 104 may also receive models of trained subject-specific decoders from one or more user devices, and may transmit these models to one or more other devices. For example, the server 104 may obtain the respective models for the decoders 110a, 110b, and 110n from the devices 102a, 102b, and 102n, respectively. The server 104 may then distribute the model of the decoder 110a to the devices 102b, 102n; the model of the decoder 110b to the devices 102a, 102n; and the model of the decoder 110n to the devices 102a, 102b. Thus, the user device 102n may receive models of up to (n−1) decoders 110a-110(n−1). In some examples, only some but not all user devices include a respective ML system, provide subject-specific encoders, and/or receive from the server 104 model(s) of subject-specific decoder(s).

Figure 1B:
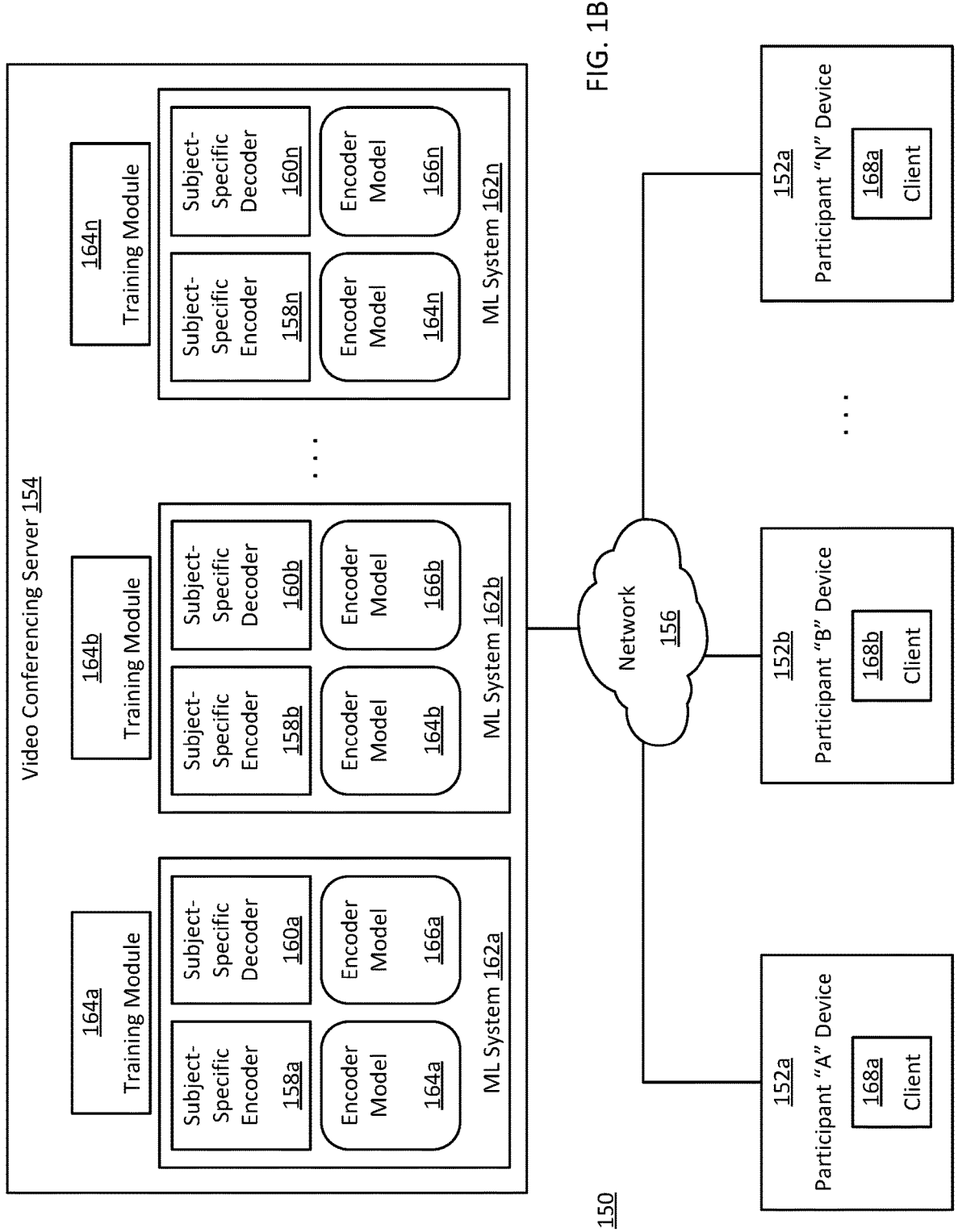

FIG. 1B schematically depicts another cloud-based video conferencing environment, 150, which is similar to the environment 100 (FIG. 1A) in that in the environment 150 also, several participants "A," "B," etc., up to participant "N" can communicate with each other by exchanging video and other information. Here again, the number N can be any number such as 2, 5, 8, 20, 40, etc. Each of the N participants uses his or her own device, e.g., user devices 152a, 152b, . . . , 152n, where a particular user device can be a desktop or a laptop computer, a tablet, a smartphone, or another smart device having a display, a camera, and one or more speakers. The participating user devices (collectively 152) communicate with a video conferencing server 154 via a network 156 which can be the Internet, a public network, a proprietary network, or a secured network formed over a public network or the Internet.

The videoconferencing server 154 receives video, audio, and other transmissions from each of the participating devices 152. From the received audio signals, the server 154 can determine the participant speaking at a particular instance of time, and multicasts the video signals received from that participant to the other participants. The server 154 may multicast the video signals received from one or more non-speaking participants to the other participants, as well. As in the environment 100 (FIG. 1A), in the environment 150 also, one or more user devices 152 use respective encoders (not shown) that are customized, using machine learning, for the respective participants using those devices. In addition, a user device may also use one or more decoders (not shown), each of which is customized for a respective participant of the video conference. For exchanging video and other information with the server 154, each of the devices 152 (e.g., 152a, 152b, . . . , 152n) includes a respective client module 168 (e.g., 168a, 168b, . . . , 168n).

Unlike in the system 100 (FIG. 1A), where the training of an ML system to provide an encoder and a decoder customized to a particular participant is performed at the device used by that particular participant, in the system 150 such training is performed at the videoconferencing server 154. To that end, a user device (e.g., the device 152a) provides a training video to the server 152. The duration of the training video can be short (e.g., only a few minutes).

To provide the training video, the participant for whom the encoder and decoder are to be trained is requested to mimic actions, such as speaking, walking about, etc., that the participant would normally take during an actual videoconference, and to record such actions using the participant's device. The recorded training video is then received at the server 152. The recorded video may be encoded using a standardized encoding technique such as, e.g., H. 265, H. 264, AV1, VP9, etc. In some cases, uncompressed video may be transmitted from a participant's device (e.g., 152a) to the server 154, though, due to the high bitrate of such video (e.g., 1.5 Gbps for high definition (HD) video), it may take a long time to upload even a short, e.g., 5 min. long, uncompressed video.

To provide a customized, subject-specific encoder-decoder pair for a participant for whom a training video was received, the server 154 includes one or more machine-learning (ML) systems 162 (e.g., 162a, 162b, 162n), and training modules 164a (e.g., 164a, 164b, 164n). The number of ML systems and/or the number of training modules available at the server 154 can be the same as the number of participants (N) to the video conference or, each of these numbers can be any other number.

In some examples, the server 154 may provide only one ML system 162 and only one training module 164 and, as such, customized encoder-decoder pairs may be generated for several participants one at a time. On the other hand, if two or more ML systems 162 are available, two or more customized encoder-decoder pairs may be generated simultaneously for two or more participants. The two or more ML systems may be trained using a single training module 164 or using more than one training modules. In some examples, one or more ML systems may be trained at the server 154 and one or more ML systems may be trained at one or more devices 152, as described with reference to FIG. 1A.

One or more ML systems 162 may be of the same type and/or subtype or may be of different types and/or subtypes. The type of an ML system 162 can be a support vector machine (SVM), an artificial neural network (ANN), etc. The subtypes, for example of an ANN, can be recurrent neural network (RNN), a long short-term memory network (LSTM), an autoencoder, a deep convolutional network (DCN), etc. Upon training an ML system (e.g., 162a) using the training video received from a particular participant (e.g., the participant using the device 152a), as described below with reference to FIG. 2, the ML system (e.g., 162a) is configured as a subject-specific encoder and a corresponding subject-specific decoder (e.g., an encoder 158a and an decoder 160a). The server 154 also generates corresponding models, e.g., an encoder model 164a and a decoder model 166a. These models are transmitted to the device of the participant for whom the models were generated by training (also called trained models), e.g., the device 152a. Using these models, the device 152a can build an encoder and a decoder for subsequent use during videoconferencing.

Typically, the server 154 builds customized encoders and decoders, and the corresponding encoding and decoding models, for several, if not all the participants to a videoconference. As such, the server 154 may include encoder models 164a, 164b, . . . , 164n and decoder models 166a, 166b, . . . , 166n. The server 154 may provide the encoder models 164a, 164b, . . . , 164n to the respective devices 152a, 152b, . . . , 152n. Since a particular device (e.g., 152a) may receive encoded video transmitted by any other device (e.g., 152b, . . . , 152n), the server 154 my provide to a particular device (e.g., 152a) not only the decoder model that is customized for the participant using that particular device (i.e., the decoder model 166a), but one or more of the other decoder models (e.g., 166b, . . . , 166n), as well. Using these models, any device (e.g., 152b) can decode the video transmitted by any other device (e.g., 152a, 152n, etc.).

Figure 2:
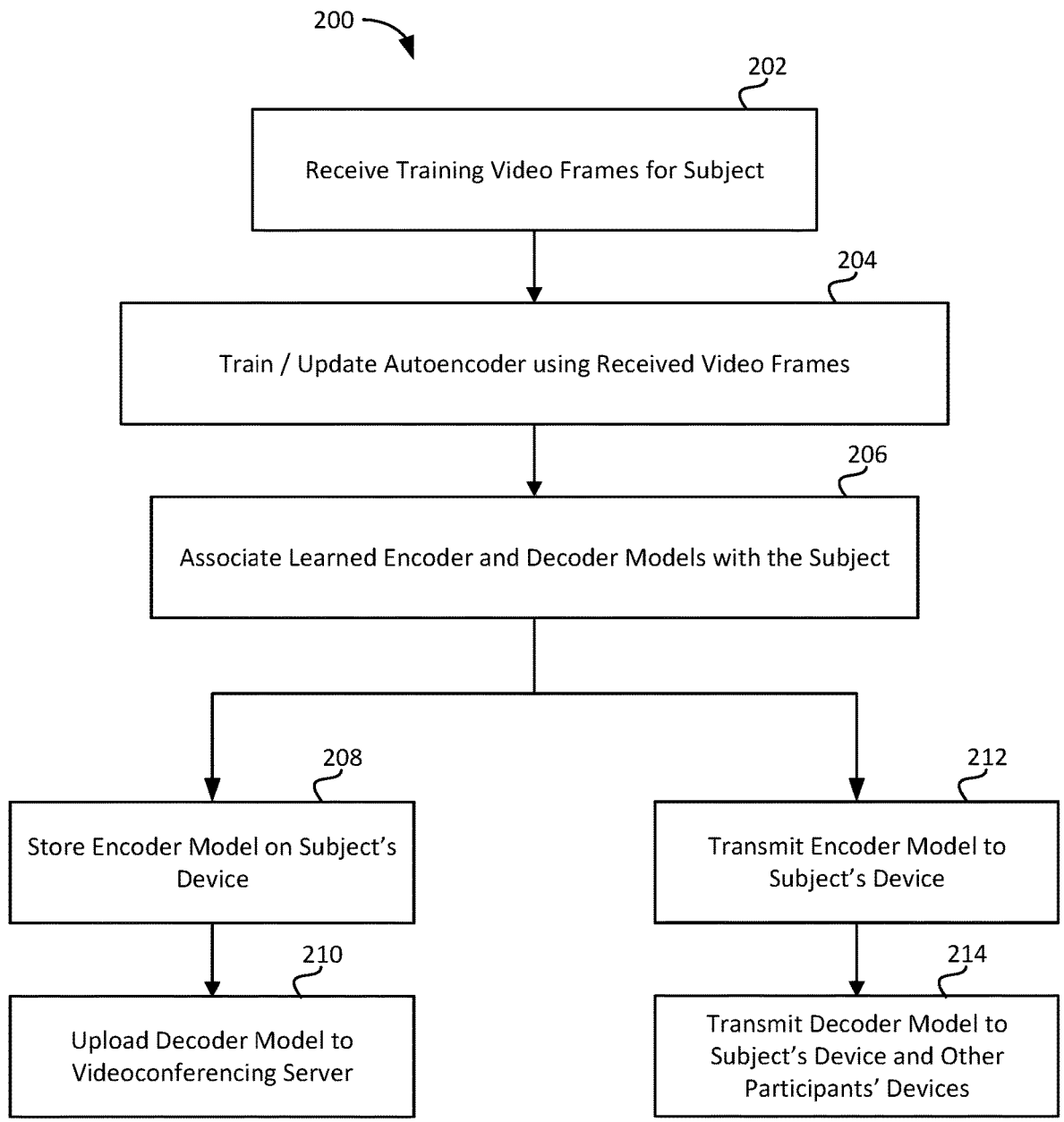
FIG. 2 is a flow chart of an exemplary process for providing a subject-specific encoder and a subject specific decoder at a user device, via machine learning.

FIG. 2 is a flow chart of a process 200 for providing a subject-specific encoder and a subject specific decoder at a user device, via machine learning. Training of an ML system according to the process 200 is performed prior to video conferencing, and can be performed either at a device of a video conference participant or at a video conferencing server. To begin training of an ML system on a user device, the user/participant is asked to speak as the user normally would during a video conference. In this, the user may sit at a table, may stand up, walk about, work on a computer while speaking at some times and look at the camera at other times, etc. In general, the user/participant is expected to act in the same way in which he or she would during an actual video conference.

In step 202, frames of the video are captured from a camera associated with the user device and are sent to the training module of the ML system installed on the user device or at a server. The video frames may be raw, i.e., they may have never been encoded and compressed, or they can be encoded and compressed using a standardized encoder at the user device. If the video frames received by the training module are encoded/compressed, in step 204, the training module decodes and uncompresses those frames using a standardized decoder, to obtain standardized reconstructed frames. If the training module is provided at the user device, the standardized decoder if also provided at the user device. In the alternative, if the training module is provided at a video conferencing server, the standardized decoder is provided at the server. In the discussion below, the raw video frames and/or the standardized reconstructed frames are collectively referred to as the original frames.

In step 204, the training module uses the original frames to build a training set and a test set of video frames. First, in the learning phase of the training process, the training set is used to train the ML system, where the ML system is configured to encode and compress the original frames to obtain ML-based encoded frames and, thereafter, to decode the ML-based encoded frames to obtain ML-based reconstructed frames. The ML-based reconstructed frames are compared with the original frames and the differences between the original frames and their corresponding ML-based reconstructed frames are used to adjust one or more parameters of the ML system. This process continues until the differences between the original and the corresponding ML-based reconstructed frames, also known as training errors, fall below a specified training-error threshold.

Then, in the verification phase of the training process, the above-described operations are repeated, in part, using the test set. In particular, the now trained ML system is used to encode and compress the original frames of the test set to obtain ML-based encoded frames, and then to decode the ML-based encoded frames to obtain ML-based reconstructed frames. The ML-based reconstructed frames are compared with the original frames of the test set and the differences between the original frames of the test set and their corresponding ML-based reconstructed frames, also known as test errors, are computed. If the test errors do not exceed a specified test-error threshold, it is determined that the ML system is adequately trained.

Otherwise, it is determined that the ML system is not adequately trained, and the learning phase is resumed. In this, one or more parameters of the ML system may be adjusted further so as to reduce the test errors that would be computed again by repeating the verification phase. In some cases, the user may be asked to provide additional samples of training video and, using the additional samples, the training sets and/or test sets may be enlarged or modified. The learning phase and the verification phase may then be repeated using the enlarged or modified training and test sets.

After the completion of the repeated learning phase, i.e., when the recomputed training errors fall below the specified training-error threshold, the verification phase is repeated to determine whether the recomputed test errors also fall below the test-error threshold. The learning and verification phases may be repeated, as needed, until the test errors fall below the test-error threshold, and it is then determined that the ML system is adequately trained.

Since the ML system was configured both to encode the original video frames and to decode ML-based encoded frames, when the training is completed, the fully trained ML system includes an encoder and a decoder. Since the encoder and decoder are both trained using the original video frames obtained from a single user/participant, the encoder and decoder are customized for that particular user/participant. In other words, the encoder and the decoder are a subject-specific encoder and a subject-specific decoder, respectively, where the subject of the encoding and decoding is the user/participant from whom the original frames used in training were obtained. As such, in step 206, the learned (i.e., fully trained) encoder and decoder are associated with the user/participant for whom one or more training videos were obtained.

In machine learning, a trained ML system is often represented by a model (called an ML model), which specifies the type of the ML system, such as, e.g., a support vector machine (SVM), an artificial neural network (ANN), etc. The model may also specify subtypes of the ML system. For example, an ANN can be recurrent neural network (RNN), or a long short-term memory network (LSTM), an autoencoder, a deep convolutional network (DCN), etc. It should be understood that an autoencoder is a type of an ANN, whereas the terms encoder and decoder, as used in this disclosure, refer to video encoders and decoders. As such, an encoder and/or a decoder can be implemented as an autoencoder.

A typical ML model also includes various configuration parameters used for configuring an untrained ML system of the type specified in the model, so that the ML system after configuration thereof would function as a trained ML system defined by the configuration parameters included in the model. In step 206, the subject-specific encoder and decoder obtained via the training operations are represented as corresponding encoder and decoder models, and these models are also associated with the user/participant for whom one or more training videos were obtained.

If the training were performed at a user device, in step 208, the encoder and/or the decoder models are stored at the user device used for training, for subsequent use during video conferencing. In step 210, the decoder model is uploaded to a video conferencing server. Prior to commencing a video conference, the server can distribute the decoder model to the respective user devices of one or more other participants of the video conference.

If the training were performed at a video conferencing server, in step 212, the encoder and/or the decoder models are transmitted to the device of the participant for whom the models were derived, so that using the received models, that particular user's device can build a subject-specific encoder and a subject-specific decoder that are customized for the user (participant) of that device. These subject-specific encoder and decoder can be used subsequently during a video conference. Prior to commencing a video conference, in step 214, for each participant for whom the server derived a decoder model, the server may transmit that decoder model to the devices of all other participants, so that those devices can build, using the received decoder models, copies of subject-specific decoders customized to one or more participants of the video conference.

Figure 3A:
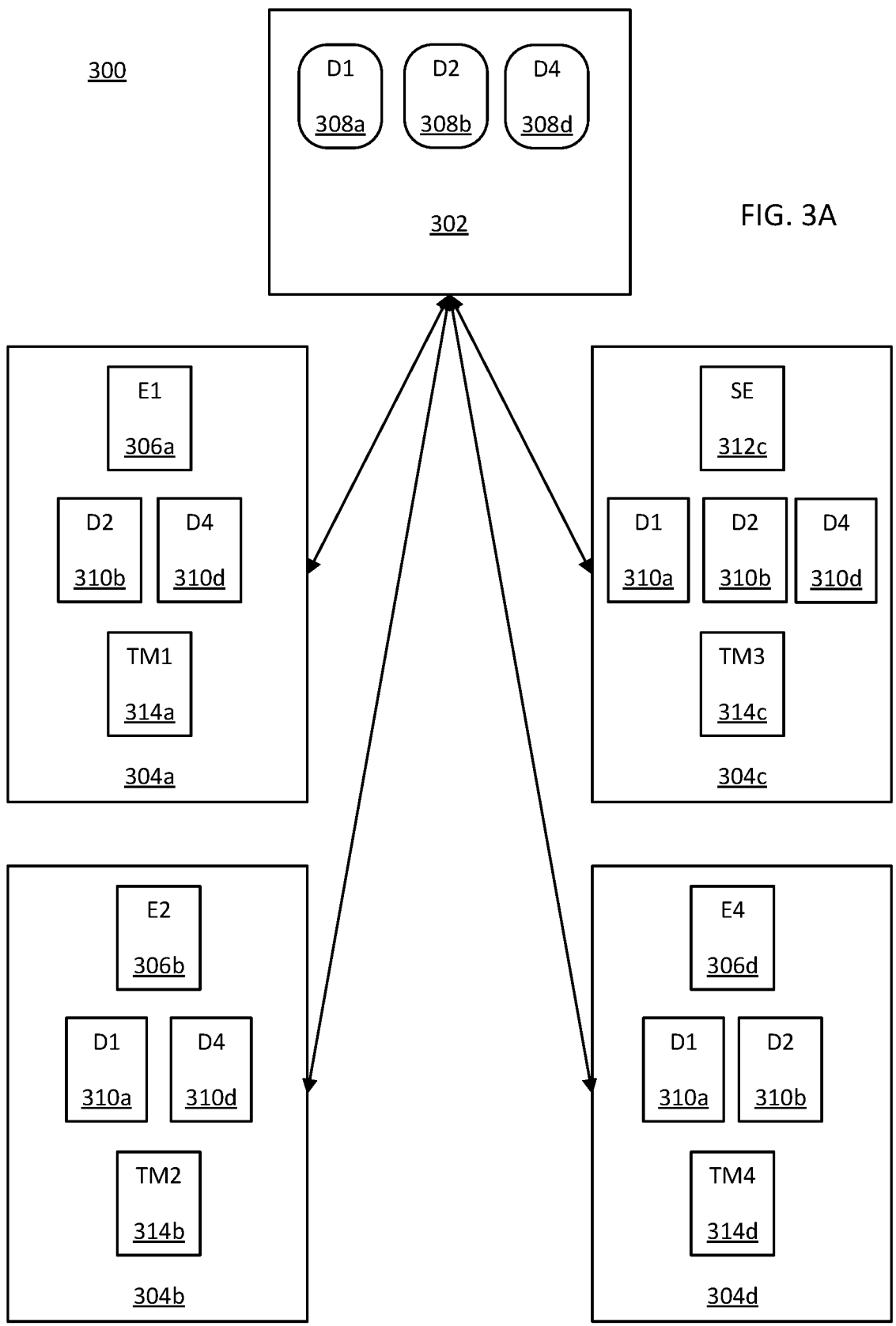
FIG. 3A depicts a configuration of an exemplary video conferencing system prior to commencing the video conference, according to one example.

FIG. 3A depicts a configuration of an exemplary video conferencing system 300 prior to commencing a video conference. The system 300 includes a video conferencing server 302, and four participant devices 304*a*-304*d*. It should be understood that a video conference having four participants is illustrative only and that, in general, a video conference can have any number (e.g., 2, 3, 8, 15, 50, etc.) participants, and the video conferencing system may have a corresponding number of participating devices.

Prior to commencing the video conference, the participating devices 304*a*, 304*b*, and 304*d* generate, via training as described with reference to FIG. 2, subject-specific encoders 306*a*, 306*b*, and 306*d* that are customized for their respective users. The devices 304*a*, 304*b*, and 304*d* also generate, during the training mode, subject-specific decoders, and supply the respective decoder models 308*a*, 308*b*, and 308*d* to the video conferencing server 302. The sever 302 provides storage for all the decoder models and, in some cases, for encoder models for all the different participants, as well. The server 302 may also distributes the decoder models so that device 304*a* receives decoder models 308*b* and 308*d*; device 304*b* receives decoder models 308*a* and 308*d*; device 304*c* receives decoder models 308*a*, 308*b* and 308*d*; and device 304*d* receives decoder models 308*a* and 308*b*. The devices 304*a*-*d* may also have storage for storing the respective decoder models for all of the participants in a video conference.

Using the received models, device 304*a* builds decoders 310*b* and 310*d* that are customized for the users of devices 304*b* and 304*d*, respectively. Likewise, device 304*b* builds decoders 310*a* and 310*d* that are customized for the users of devices 304*a* and 304*d*, respectively. Device 304*c* builds decoders 310*a*, 310*b*, and 310*d* that are customized for the users of devices 304*a*, 304*b*, and 304*d*, respectively, and device 304d builds decoders 310a and 310b that are customized for the users of devices 304a and 304b, respectively.

Prior to the commencement of the video conference, device 304c had not built a subject-specific encoder and a subject-specific decoder that is customized for the user of device 304c. As such, device 304c uses a standardized encoder 312c for encoding and compressing its video transmissions. Devices 304a, 304b, and 304d include standardized decoders (not shown) and, optionally, standardized encoders (not shown), in addition to the subject-specific encoders and decoders. The devices 304a, 304b, 304c, and 304d also include respective training modules 314a, 314b, 314c, and 314d. At the device 304c, the type and the basic structure of the ML system to be trained by the training module 314c may be received from the video conferencing server 302.

The above-described operations may be performed only once, prior to the commencement of the first video conference involving the participants associated with the devices 304a, 304b, 304d. In other words, once a device (e.g., 304a) builds a decoder 310b for the user of the device 304b, the user device need not build the decoder again prior to commencing another, second conference in which the user of the device 304b is participating. If such later video conference includes a different participant, however, a model for the decoder customized for that participant may be received from the server 302 and the corresponding decoder may be built at the device 304a, prior to commencing the later, second conference.

During video conferencing, the video transmitted by the device 304a is encoded using the subject-specific encoder 306a that is customized for the user of the device 304a. The video transmitted by the device 304b is encoded using the subject-specific encoder 306b that is customized for the user of the device 304b. At least initially, the video transmitted by the device 304c is encoded using the standardized encoder 312c. The video transmitted by the device 304d is encoded using the subject-specific encoder 306d that is customized for the user of the device 304d. The server 302 receives the videos transmitted by each of the devices 304a-304d and forwards each received video to all devices other than the device that transmitted the particular video.

Thus, during video conferencing, when the user of the device 304a speaks, devices 304b, 304c, and 304d receive the video transmitted by the device 304a from the server 302. These devices decode the received video using instances of the decoder 310a, formed using the model 308a, on each of the devices 304b, 304c, and 304d. In a similar manner, when the user of the device 304b (or 304d) speaks, the devices 304a, 304c, and 304d (or 304b) receive the video transmitted by the device 304b (or 304d) from the server 302, and decode the received video using instances of the decoder 310b (or 310d), formed using the model 308b (or 308d), on each of the devices 304a, 304c, and 304d (or 304b). When the user of the device 304c speaks, the devices 304a, 304b, and 304c receive the video transmitted by the device 304c from the server 302. In this case, however, at least initially, these devices decode the received video using instances of a standardized decoder (not shown) on each of the devices 304a, 304b, and 304c.

Figure 3B:
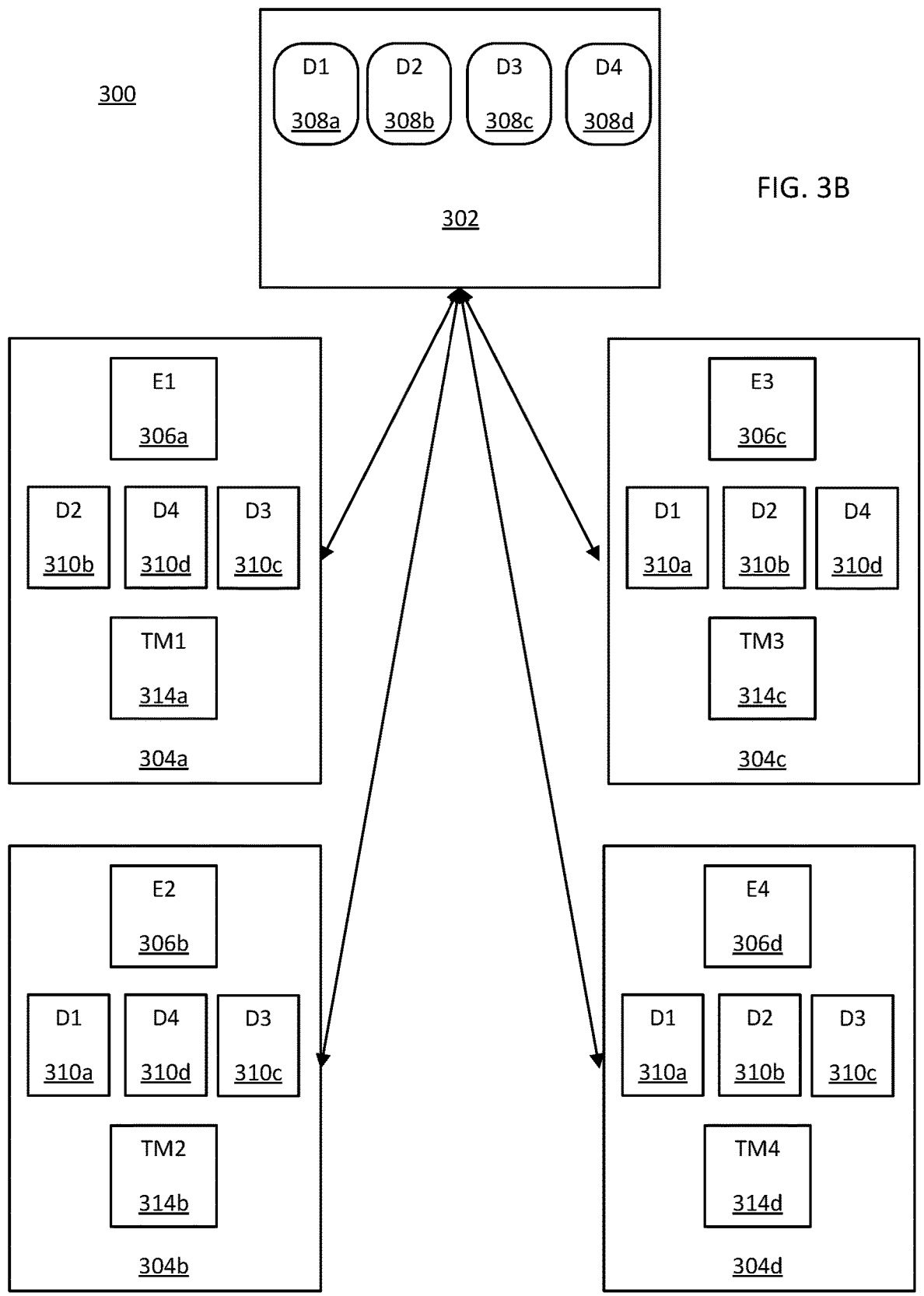
FIG. 3B depicts a modified configuration of the video conferencing system depicted in FIG. 3A, after the video conference has commenced, according to one example.

FIG. 3B depicts a modified configuration of the video conferencing system 300, after the video conference has commenced. During video conferencing, one or more of the training modules 314a, 314b, and 314d may update the associated encoder and/or decoder. As an example, the training module 314a may receive the original video frames generated by the video camera of the device 304a while the video conference is on-going and when the user of the device 304a speaks. The original video frames can be raw video frames that have never been encoded/compressed, or standardized reconstructed frames that are obtained by decoding standardized encoded frames, where the latter are obtained by encoding raw video frames using a standardized encoder.

As in the training mode (described with reference to FIG. 2), these original frames may be divided into a training set and a test set. The training set may be used in a learning phase to refine further the encoder 306a and/or the decoder 310a and the corresponding model 308a. In particular, one or more parameters of the encoder 306a and/or the decoder 310a may be adjusted further, for example, to improve the perception quality of the video reconstructed from the video encoded by the subject-specific encoder and/or to improve the compression ratio.

The test set may be used in a verification phase to determine that the testing errors (computed as described with reference to FIG. 2) are below the test-error threshold. The test-error threshold may be changed to require an improvement in the encoder 306a and/or the decoder 310a. The learning and verification phases may be repeated, as needed, until it is determined that the encoder 306a and/or the decoder 310a are improved. The improvement can be determined by comparing the respective perception qualities of the reconstructed frames provided by the decoder 310 and the original frames. Techniques such as Sobel and/or Laplace filtering, fast Fourier transform based spectral analysis, first-order differencing, color distortion measurements, etc., can be used to compare the perception qualities. Thereafter, an updated ML model 308a for the decoder 310a, if it is improved, may be transmitted to the video conferencing server 302. The server 302 may then transmit the updated ML model 308a to the devices 304b, 304c, and 304d, which may then update their respective instances of the decoder 310a.

The above-described updates to the encoders and/or decoders may be performed at other user devices, e.g., the devices 304b and/or 304d, as well. Some user devices may be configured not to perform the updates. Some devices may perform training and may update their respective encoders and/or decoders continuously while the video conferencing is on-going. Other devices may perform training and updating periodically, e.g., every 5 min, 20 min, etc. Some devices may transmit the updates to their respective decoder models to the server 302 in a periodic manner, e.g., every 10 min, 30 min., etc. Some devices may transmit the updates only once, at the end of the video conferencing. One or more devices may also be configured to transmit their respective updates when the improvement in the encoder and/or decoder, measured using a suitable metric such as test loss, area under the receiver operating characteristic curve (AUC), etc., is at least equal to a specified update threshold.

In the system 300, while the video conference is on-going, the training module 314c receives the raw video frames generated by the video camera of the device 304c when the user of the device 304c speaks. As described with reference to FIG. 2 in the context of the training mode, the training module 314c uses these raw frames to train an ML system on the device 304c. Upon determining that the ML system is adequately trained, an encoder 306c and a decoder model 308c, that are subject specific, and customized for the user of the device 306c, become available. The device 304c then transmits the decoder model 308c to the sever 302, which then transmits it to the other participating devices, i.e., the devices 304a, 304b, and 304d.

For the remainder of the video conference, the device 304c stops using the standardized encoder 312c and, instead, encodes the raw video frames received from its camera using the encoder 306c that is customized for the user of device 304c. The devices 304a, 304b, and 304d construct respective instances of the decoder 310c using the model 308c received from the server 302. To decode the video frames transmitted by device 304c and received from the server 302, the devices 304a, 304b, and 304d no longer use their respective standardized decoders and, instead, use their respective instances of the decoder 310c that is customized for the user of the device 304c. The encoder 306c and/or the decoder 310c and the corresponding model 308c may be updated, as described above, during the remainder of the video conference.

Although FIGS. 3A and 3B depict training modules 314a-d at the devices 304a-d respectively, and the foregoing discussion describes performing training at the devices 304a-d while the video conference is on-going, in some examples, one or more training modules (such as the training modules 164 of the environment 150 (FIG. 1B)) may be provided, in the alternative or in addition, at the video conferencing server 302. Accordingly, training to update one or more subject-specific encoder/decoder ML models may be performed at the server 302. To this end, one or more user devices 304a, 304b, and/or 304d may transmit original video frames to the server 302, in addition to the encoded video frames produced by the encoders 306a, 306b, and/or 306c. Using the original video frames, the server 302 may update the ML-based encoder models for the encoders 306a, 306b, and/or 306c (e.g., as described with reference to FIG. 2), and may transmit the updated model(s) back to the devices 304a, 304b, and/or 304c. These devices may then update their respective encoders using the updated encoder models.

As part of the model-updating process, the server 302 may updates the ML-based decoder models 308a, 308b, and/or 308d for one or more subject-specific decoders, e.g., 310a, 310b, and/or 310d. The server 302 may then multicast the updated decoder models 308a, 308b, and/or 308d to all the devices 304a-c and, using the received updated decoder models, the devices may then update their respective decoders.

Training an ML system to derive new subject-specific encoder and decoder models can also be performed by the server 302. For example, rather than using the training module 314c on the device 304c as described above, in some examples, the server 302 derives new ML models that are customized for the participant using the device 304c, while the video conference is on-going. Specifically, a training module (not shown) at the server 302 (such as one of the training modules 164 of the environment 150 (FIG. 1B)) may receive video from the device 304c that is encoded using the standardized encoder 306c. The training module at the server may decode frames of this video using a standardized decoder (not shown) to obtain standardized reconstructed video. Frames of the standardized reconstructed video may then be used by the training module at the server 302 to derive a new subject-specific encoder model (not shown) and a corresponding new subject-specific decoder model 308c. Training may also be performed by receiving and using at the server 302 raw, unencoded frames. The encoder model may then be transmitted to the device 304c.

A client module (not shown) at the device 304c can then build the encoder 306c at the device 304c using the received encoder model, and then switch the subsequent encoding of the video to be transmitted by the device 304c from using the standardized encoder 312c to using the encoder 306c that is customized to the participant using the device 304c. The server 302 may also multicast the newly derived decoder model 308c to all of the other devices, i.e., the devices 304a, 304b, and 304d, so that the devices 304a, 304b, and 304d can build instances of the decoder 310c to decode subsequently received video transmitted from the device 304c.

Figure 4A:
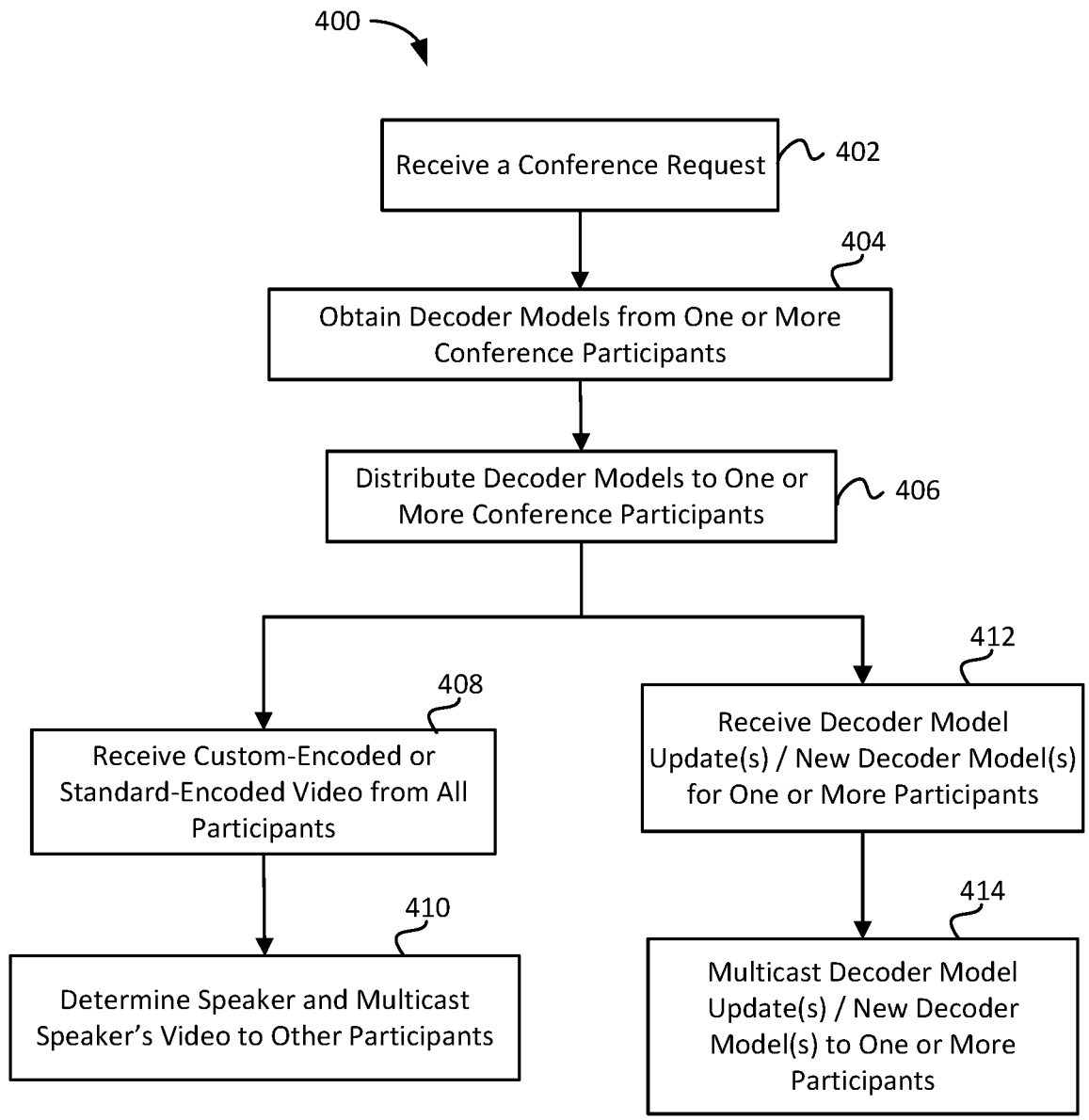
FIGS. 4A and 4B are flow charts of two exemplary procedures executed by a video conferencing server, according to two different examples.

FIG. 4A is a flow chart of a procedure 400 executed by a video conferencing server. In step 402, the server receives a conference request that identifies the participants of the conference. One of the participants may be a host. As part of the conference request, a participant may be required to provide information identifying the participant e.g., a participant identifier (ID), login password, etc. In step 404, the server obtains subject-specific decoder models for one or more participants (individuals) from one or more user devices. In some cases, the server may have already obtained the decoder models for one or more participants, e.g., in response to a prior conference request. In that case, decoder model(s) for such participant(s) may be stored at the server already and may not be requested again. In step 406, for each received and previously stored decoder model, the server transmits the model to the devices of all participants other than the device of the participant for whom the model is customized.

When the video conference commences, in step 408, the server receives encoded video frames from all participants. The video frames from one or more participants may be encoded using respective subject-specific encoders, and video frames from one or more participants may be encoded using standardized encoders. In some examples, the video frames received from all participants are encoded using respective subject-specific encoders. In step 410, the server determines the speaker, and multicasts the video frames received from the device used by the speaker to the devices used by all other participants. In some examples, the server may multicast the video framers received from each participant to all other participants, regardless of which participant is speaking.

While the video conference is on-going, in step 412, the server may receive updates to one or more decoder models of one or more participants. The server may also receive new decoder models for one or more participants. Step 412 may overlap with steps 408, 410. In step 414, the server may transmit an updated (or a new) decoder model for a particular participant to all other participants. Step 414 may be repeated for one or more participants, and may overlap with steps 408, 410.

Figure 4B:
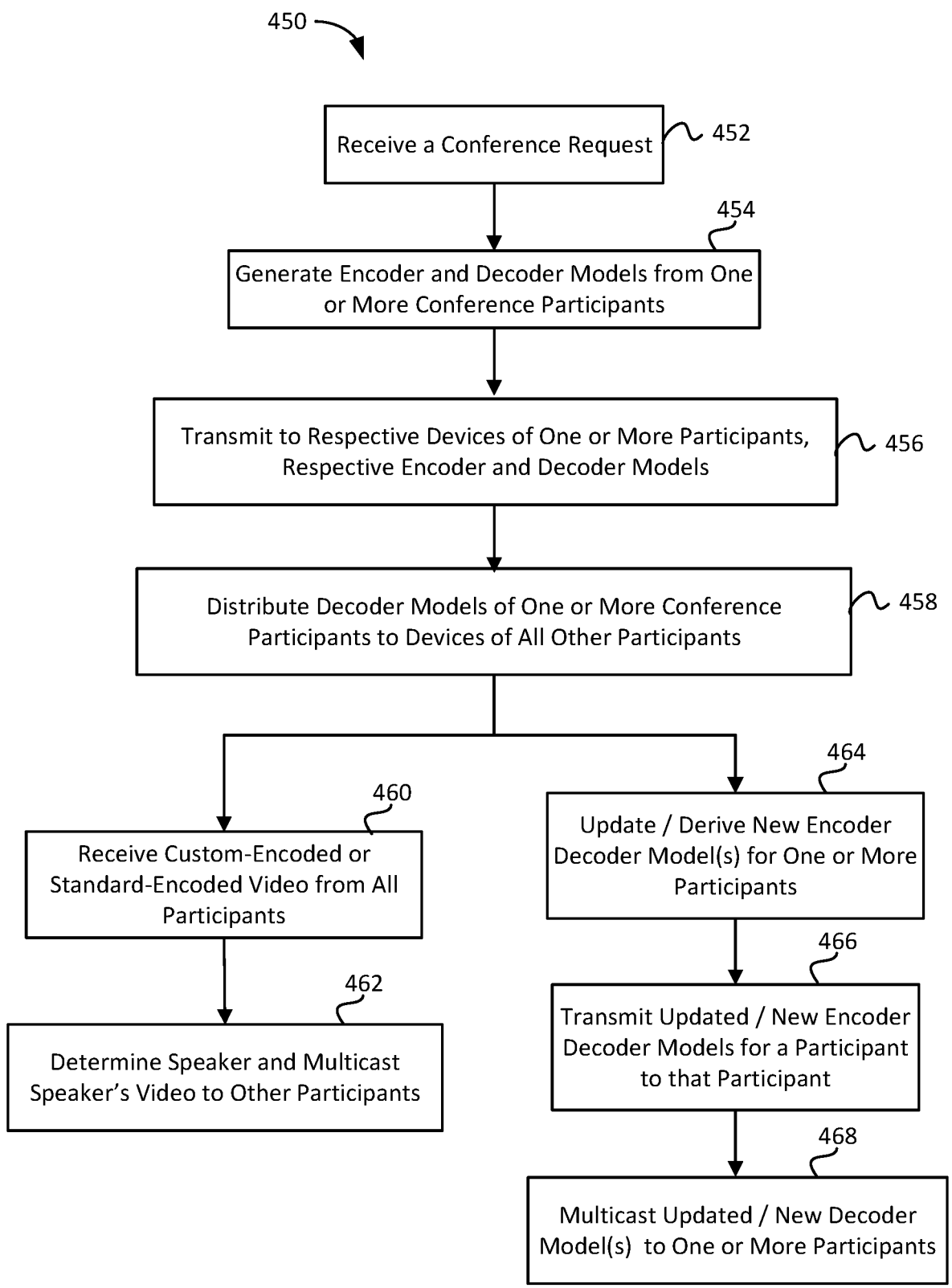

FIG. 4B is a flow chart of a procedure 450 executed by a video conferencing server. One difference between the procedure 400 (FIG. 4A) and the procedure 450 is that in the procedure 4A, the training of the ML system(s) and derivation of the subject-specific ML model(s) are performed at the user devices. According to the procedure 450, these operations are performed at the videoconferencing server. In some examples, the sever may derive the ML model(s) for one or more participants and the user device(s) may derive the ML model(s) for one or more participant(s).

In step 452, the server receives a conference request that identifies the participants of the conference. Here again, one of the participants may be a host and, as part of the conference request, a participant may be required to provide information identifying the participant, e.g., a participant identifier (ID), login password, etc. In step 454, the server derives subject-specific encoder/decoder models for one or more participants (individuals) using videos received from one or more devices. In some cases, the server may have already obtained or derived the encoder/decoder models for one or more participants, e.g., in response to a prior conference request. In that case, encoder/decoder model(s) for such participant(s) may be stored at the server already and may not be derived again. In step 456, the server transmits each derived pair of encoder-decoder models to the respective device of the participant for whom that pair was customized. In step 458, for each derived and already stored decoder model, the server transmits the model to the devices of all participants other than the device of the participant for whom the model is customized.

When the video conference commences, in step 460, the server receives encoded video frames from all participants. The video frames from one or more participants may be encoded using respective subject-specific encoders, and video frames from one or more participants may be encoded using standardized encoders. In some examples, the video frames received from all participants are encoded using respective subject-specific encoders. In step 462, the server determines the speaker, and multicasts the video frames received from the device used by the speaker to the devices used by all other participants. In some examples, the server may multicast the video framers received from each participant to all other participants, regardless of which participant is speaking.

While the video conference is on-going, in step 464, the server may generate updates to one or more encoder/decoder model pairs of one or more participants. In some examples, the server may decide whether an update to the encoder/decoder model for a particular participant is needed. To make such a determination, the server may request, from time to time, from the device of that participant, one or more video segments that are either unencoded or are encoded using a standardized encoder. These video segments are received in addition to receiving custom-encoded video, i.e., video encoded using the subject-specific encoder provided at the participant's device. If the additional video segments are encoded using a standardized encoder, the server may uncompress those video segments using a standardized decoder to obtain standard-based reconstructed video.

The server may also decode the custom-encoded video using a subject-specific decoder for the participant, to obtain ML-based reconstructed video. The perception quality of the ML-based reconstructed video can be compared with the perception quality of the unencoded video and/or the standard-based reconstructed video, to determine whether the former needs to be improved. Techniques such as Sobel and/or Laplace filtering, fast Fourier transform based spectral analysis, first-order differencing, color distortion measurements, etc., can be used to compare the perception qualities.

The server may also derive new encoder/decoder model pairs for one or more participants. As described with reference to FIG. 1B, the server may receive from the participant's device unencoded video or video encoded using a standardized encoder. In the latter case, the video encoded using a standardized encoder may be uncompressed using a standardized decoder, to obtain standard-based reconstructed video. The unencoded video or the standard-based reconstructed video (collectively, original video) may be used to train an ML system to derive a subject-specific encoder/decoder pair for a particular participant, as described with reference to FIG. 2.

The original video would then be encoded using the subject-specific encoder and then decoded using the subject-specific decoder to obtain ML-based reconstructed video. Whether the ML system is adequately trained may be determined by comparing the perception quality of the ML-based reconstructed video with that of the original video, where the comparison can be made using techniques such as Sobel and/or Laplace filtering, fast Fourier transform based spectral analysis, first-order differencing, color distortion measurements, etc.

Step 464 may overlap with steps 460, 462. In step 466, the server may transmit an updated (or a new) encoder/decoder model pair for a particular participant to the device used by that participant. In step 468, the server may multicast the updated (or new) decoder models for a particular participant to the devices of all other participants. Steps 466, 468 may be repeated for one or more participants, and may overlap with steps 460, 462.

Figure 5:
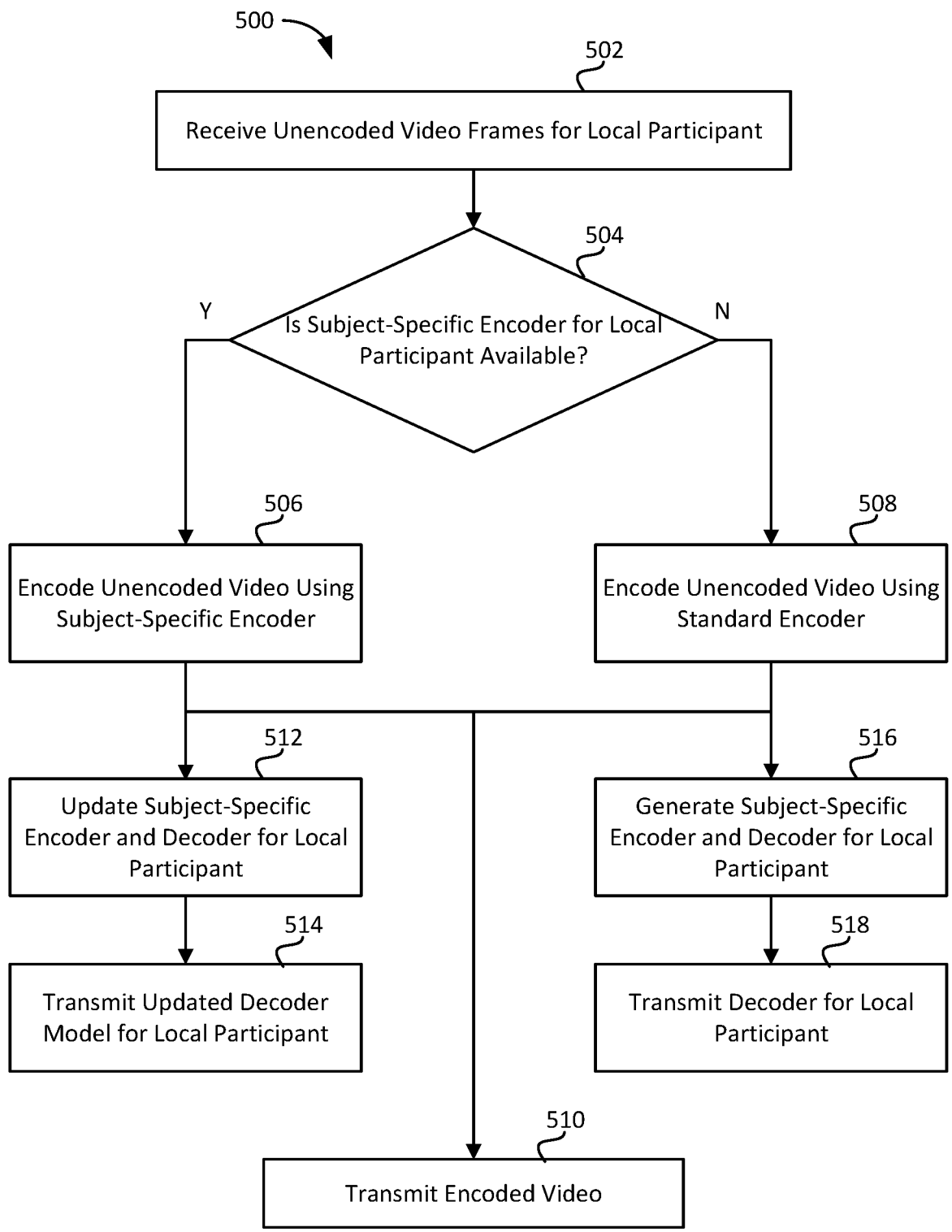
FIG. 5 is a flow chart of an exemplary encoding process performed at a device of a participant to a video conference.

FIG. 5 is a flow chart of an exemplary encoding process at one particular participant, referred to as a local participant. In step 502, original video frames are received by a training module on the device used by the local participant. The original video frames are either raw, unencoded video frames received from the camera of a device used by the local participant, or standard-based reconstructed video frames obtained by decoding, using a standardized decoder, encoded video frames obtained by encoding raw video frames using a standardized encoder.

Step 504 determines if a subject-specific encoder is available on the device of the local participant. If such an encoder is available, in step 506, the original video frames are encoded and compressed using the subject-specific encoder. If a subject-specific encoder is not available for the local participant, and if raw, unencoded video frames have not been encoded already using a standardized encoder, in step 508, the raw unencoded video frames are encoded and compressed using a standardized encoder. The encoded, compressed video frames are transmitted to a video conferencing server in step 510.

In optional step 512, the subject-specific encoder and/or decoder for the local participant and/or the corresponding decoder model are updated by using the unencoded video frames received in step 502 for training the encoder and/or decoder further. In some examples, the device used by the local participant may decide whether an update to the subject-specific encoder/decoder model for a particular participant is needed. To make such determination, the device may decode the custom-encoded video using a subject-specific decoder for the participant, to obtain ML-based reconstructed video. The perception quality of the ML-based reconstructed video can be compared with the perception quality of the original video, to determine whether the former needs to be improved. Techniques such as Sobel and/or Laplace filtering, fast Fourier transform based spectral analysis, first-order differencing, color distortion measurements, etc., can be used to compare the perception qualities.

In optional step 514, the updated model of the subject-specific decoder for the local participant is transmitted to the video conferencing server. If a subject-specific encoder was determined not to be available in step 504, in optional step 516, subject-specific encoder and decoder, that are customized for the local participant, are generated using the original video frames received in step 502 for training an ML system. A model for the subject-specific decoder is also generated and, in optional step 518, the newly generated decoder model is transmitted to the video conferencing server.

To determine whether the ML system on the participant's device is trained adequately, the device may decode the custom-encoded video using the subject-specific decoder for the participant, to obtain ML-based reconstructed video. The perception quality of the ML-based reconstructed video can be compared with the perception quality of the original video, to determine whether the former needs to be improved. When no further improvement is needed, the ML system is determined to be trained adequately. Techniques such as Sobel and/or Laplace filtering, fast Fourier transform based spectral analysis, first-order differencing, color distortion measurements, etc., can be used to compare the perception qualities.

Figure 6:
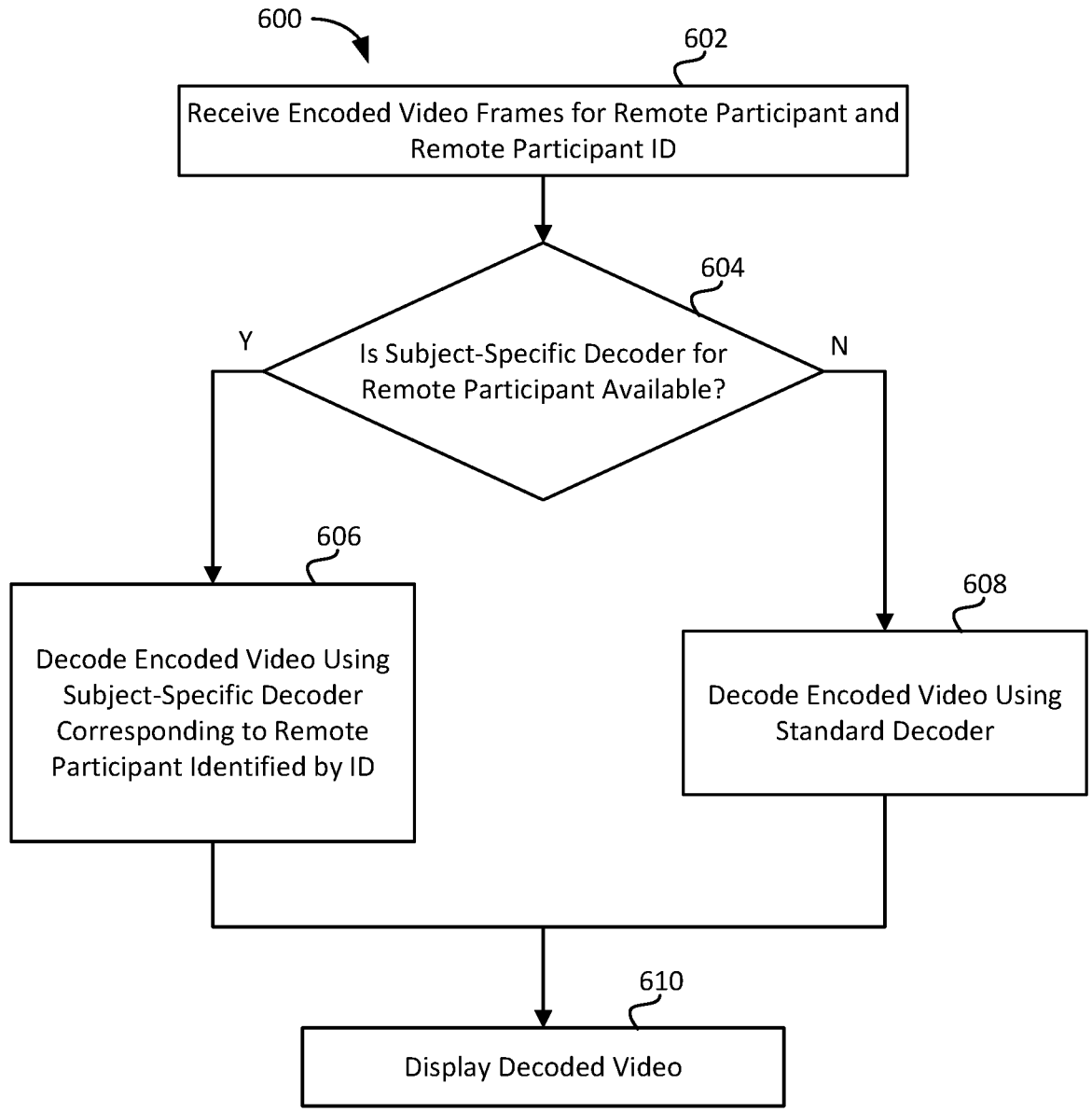
FIG. 6 is a flow chart of an exemplary decoding process performed at a device of a participant to a video conference.

FIG. 6 is a flow chart of an exemplary decoding process at one particular participant, referred to as a local participant. In step 602, encoded video frames for a remote participant, and an identifier (ID) for the remote participant are received from a video conferencing server. Typically, the server multicasts the encoded video frames for the remote participant when he or she is speaking. The server may multicast the encoded video frames for the remote participant even when he or she is not speaking. Using the ID of the remote participant, step 604 determines or selects a subject-specific decoder for the remote participant. Such a decoder can be built by configuring a machine learning system on the device of the local participant according to a subject-specific decoder model for the remote participant that may be received from the server.

If a subject-specific decoder is available for the remote participant, in step 606, the encoded video frames associated with the remote participant are decoded and uncompressed using the subject-specific decoder customized for the remote participant. If a subject-specific decoder is not available for the remote participant, in step 608, the encoded video frames associated with the remote participant are decoded and uncompressed using a standardized video decoder. In step 610, the decoded (also called reconstructed) video frames are displayed on the display of the device used by the local participant.

While the video conference is on-going, the device of the local participant may receive an updated or a new model for the subject-specific decoder for the remote participant. The device of the local participant may then update the subject-specific decoder for the remote participant using the updated model, or my construct a new subject-specific decoder for the remote participant using the new model. Step 604 may be repeated, e.g., periodically (after every few seconds, minutes, etc.) or when encoded video frames for the remote participant are received in step 602. As such, although the encoded video frames for the remote participant may be decoded using a standardized decoder in an initial portion of the video conference, later received video frames for the remote participant may be decoded using a subject-specific decoder that is customized for the remote participant.

Figure 7A:
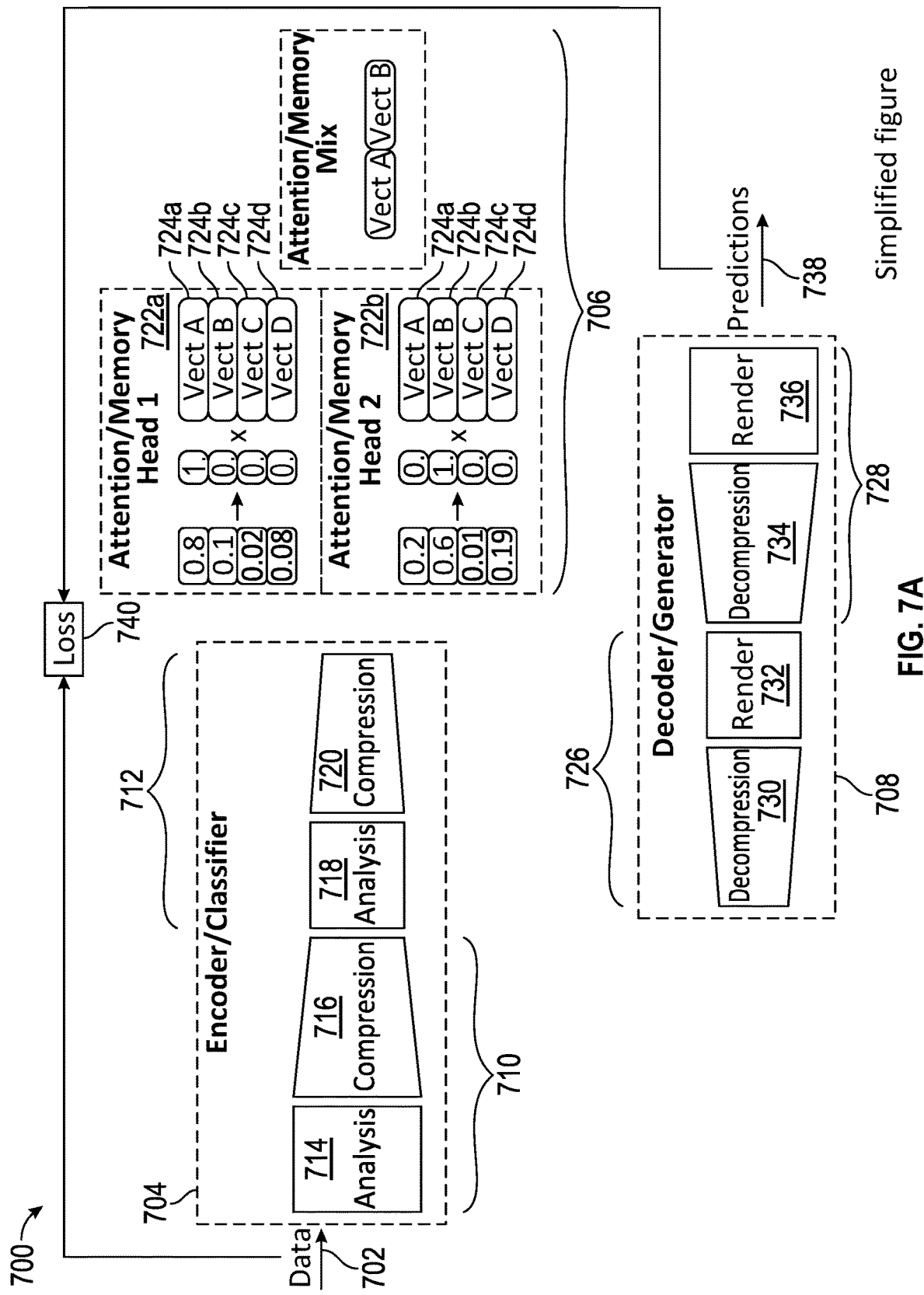
FIG. 7A schematically depicts an autoencoder that may be trained to operate as a subject-specific encoder and decoder, according to one example.

FIG. 7A schematically depicts an autoencoder 700 that may be trained to operate as a subject-specific encoder and decoder. The autoencoder 700 receives as input data 702 raw, unencoded video frames of a person (subject) for whom the autoencoder 700 is to be customized. The autoencoder 700 includes an encoding stage 704, a code stage 706, and a decoding stage 708. The encoding stage of a typical autoencoder includes one or more sub-stages that are commonly referred to as hidden layers. The autoencoder 700 includes two hidden layers 710, 712. The number of inputs to the first hidden layer 710 may correspond to the number of pixels in a frame. Thus, for a frame having 1920×1080 pixels, the number of inputs to the first hidden layer 710 may be 1920×1080=2,073,600. For a frame having 1280×720 pixels, the number inputs to the first hidden layer may be 1280×720=921,600.

The number of outputs, also called nodes, of the first hidden layer 710 is typically less than the number of inputs, so that the frame received at the input is represented using fewer number of bytes than that required to represent the inputs, so as to achieve compression of the frame. The output of the first hidden layer 710 is supplied to the second hidden layer 712. The number of outputs/nodes of the second hidden layer 712 is typically even smaller, so as to achieve further compression of the blocks. The autoencoder 700 has only two hidden layers and, as such, the number of outputs/nodes of the second hidden layer 712 is the same as the size of the code stage 706 of the autoencoder 700. As discussed below, the size of the code stage 706 is defined in terms of the size of a set of code vectors. It should be understood that the autoencoder 700 having two hidden stages is illustrative only. In general, the number of hidden layers of an encoding stage is a design parameter, and can be any number (e.g., 1, 3, 5, 8, etc.). Likewise, the numbers of outputs/nodes of each hidden layer are also design parameters that may depend on the resolution of the raw frame and the number of hidden layers.

In an autoencoder that processes video frames, a hidden layer typically performs a convolution (analysis) operation, where the frame is convolved with a selected kernel (also called a filter) of a selected size (e.g., 3×3, 4×4, etc.), to obtain corresponding sets of output values. The kernel/filter is defined in terms of adjustable kernel/filter coefficients, During training, the kernel/filter coefficient(s) may be adjusted so that the hidden layer learns to detect one or more features or characteristics that define the input of the hidden layer.

In the autoencoder 700, the first hidden layer 710 includes an analysis module 714 that performs a non-strided convolution of the input frame, i.e., the number of outputs resulting from the convolution is the same as the number of inputs to the convolution. The analysis module 714 may also treat one or more blocks of the input frame as residual blocks where the values of those blocks are not modified, i.e., they are not subjected to the convolution operation. In the autoencoder 700, the values of the input frame that are analyzed by the analysis module 714 are pixel values.

The hidden layer 710 in the autoencoder 700 also performs a compression operation using a compression module 716, where the outputs produced by the analysis module 714 are down-sampled. Specifically in down-sampling, only some but not all of the values of the outputs provided by the analysis module 714 are selected for further processing. To this end, the compression module 716 may perform strided convolution of the outputs provided by the analysis module 714. The stride parameter is greater than one, e.g., 2, 4, 6, 8, etc., and can be pre-specified in defining the ML system to be trained. The compression module 716 may also apply a selected activation function, to provide partially encoded values to the next hidden layer 712.

The values analyzed by an analysis module 718 of the second hidden layer 712 are the partially encoded values provided by the first hidden layer 710. Like the analysis module 714, the analysis module 718 may also perform a non-strided convolution operation and/or may treat one or more blocks of the input, that are partially encoded values, as residual blocks. A compression module 720 of the second hidden layer 712 performs a strided convolution and may apply the selected activation function to down-sample the convolved values and/or the residual blocks received from the analysis module 718, to provide fully encoded values representing the code stage 706 of the autoencoder 700.

In the autoencoder 700, the code stage 706 is a latent representation of indices to an embedding table having a certain number of preselected code vectors. The indices are referred to as memcodes. In one example, the number of preselected code vectors is 512 and the corresponding indices, or memcodes, range from 0 through 511. Other sizes of the set of code vectors, e.g., 64, 256, 1024, etc., and corresponding ranges of memcodes, are also contemplated. Each code vector defines at least a part of the subject's image, e.g., the subject's eyes, lips, other parts of the face, parts of head, a hand gesture, etc. In general, a part of an image or a frame can be understood as a pixel block (e.g., a block of 4×4, 8×8, 16×16, 32×64, 64×64 pixels, etc.). During training, the autoencoder 700 may derive subject-specific code vectors that correspond to a particular subject/participant for whom the autoencoder is trained. These code vectors are included in the subject-specific decoder model for that particular subject/participant.

In some examples. the code vectors customized for a particular individual is a set of weights that customize a pre-trained model of a generic individual. During training (as described with reference to FIG. 2), an individual moves around and talks in front of the camera of the device of that individual for a short time (e.g., a few minutes), so that an ML system on the device fine-tunes the pre-trained model of the generic individual using the video obtained during the training. The training provides parameters for the encoder and also weights that customize the generic individual model to the specific individual for which the ML system is trained. These customized weights are included in a weights package that can become part of the decoder model for that specific individual.

Once the training is complete, the decoder model, including the weight package, is uploaded to the video conferencing server. Upon initiating a video conference, the server can distribute the decoder model of one participant to all other participants, as described above with reference to FIGS. 3A and 3B. In some examples, the server may only establish pair-wise connections between the devices of different participants, and the devices themselves may exchange the respective decoder models. Thereafter, the devices may also exchange the memcodes directly among themselves, without the server in-between. At a viewing participant's device, the decoder for the speaking participant, constructed using the received decoder model for the speaking participant, can reconstruct the videos of the speaker from the received memcodes, the weight package for the speaker, and the model of a generic individual. As the video conference progresses, different participants can be speakers or viewers at different times.

In a typical autoencoder, the decoding stage decodes the fully encoded values provided by the encoding stage. The fully encoded values (also called full encoding) are expected to retain certain information extracted by all the preceding hidden layers, where such information may be necessary or beneficial to an accurate decoding of the fully encoded values. When the full encoding is derived from a sequence of inputs where the number of inputs in the sequence is greater than the number of hidden states of the encoding stage, however, the full encoding may not represent all of the information extracted during the encoding of the entire sequence, where some such information that is not represented by the full encoding may nevertheless be highly relevant to a proper decoding.

Therefore, referring again to FIG. 7A, the autoencoder 700 employs a technique known as multi-headed attention. In general, in decoding an encoded frame, where the frame can be considered a sequence of pixel blocks (e.g., blocks of 4×4, 8×8, 16×16, 32×64, 64×64 pixels, etc.), not all pixels blocks (also referred to as blocks) of the frame are equally relevant to the decoding of a particular block. One or more blocks can be more relevant to the decoding (also called reconstruction) of a particular block than others. For example, in the reconstruction of a face, a block representing ears can be relevant to determining whether the face to be reconstructed is that of a human or an animal. In an attention model, a unit of the input sequence (e.g., a particular word in a sentence, a particular pixel block in a frame, etc.) that is determined to be more relevant than other units of the sequence to the decoding or reconstruction of a particular unit of the output sequence to be produced is referred to as a head, and the decoder attends to, i.e., treats as important to decoding, the encoded values of the head. In multi-headed attention, not one but more than one units, i.e., heads, are identified as relevant to the decoding/reconstruction of a particular unit of the output sequence to be produced.

In the autoencoder 700, the number of attention heads is two, i.e., the autoencoder identifies two blocks of a frame as more relevant than the other blocks to the reconstruction of a particular block of the frame. In other examples, the number of attention heads can be 1, 3, 4, 6, etc. It should be understood that an attention head is not a person's head in the frame of an image to be encoded. Rather, each attention head refers to the respective encoding corresponding to the hidden state of a respective block in a sequence of blocks forming the frame to be encoded. In the autoencoder 700, the encoding of the hidden state of a block is represented by a code vector and can be identified by a corresponding memcode, as described above. The number of attention heads can be a configurable parameter of the autoencoder.

In the autoencoder 700, an encoding represented as an encoding vector {0.8; 0.1; 0.02; 0.04} corresponds to a first attention head 722a, and an encoding represented as another encoding vector {0.2; 0.6; 0.01; 0.19} corresponds to a second attention head 722b. Each value in an encoding vector corresponds to a respective code vector. In general, each code vector represents a compressed value and each value in an encoding vector indicates a respective probability that a corresponding code vector is a correct compressed representation. In FIG. 7A, only four values, and corresponding four code vectors 724a-d are depicted merely for the sake of convenience. In general, the number of values in the encoding vector is the same as the number of code vectors, e.g., 64, 128, 512, etc.

In the code stage 706, for each attention head 722a, 722b, a respective code vector that corresponds to the maximum value in the encoding vector associated with the respective attention head is selected. Thus, for the attention head 722a, the code vector 724a (Vect A) is selected and for the attention head 722b, the code vector 724b (Vect B) is selected. Each code vector represents a unique combination of the features of the person for whom the autoencoder 700 is trained. The features may include the shape or movement of the person's eye, a position of a finger while speaking, a positioning of the lips, etc.

As described above, a memcode is an index of a code vector. In the autoencoder 700, since only four code vectors are used, their indices range from 0 through 3. As such, the memcode corresponding to the attention head 722a is "0" and the memcode corresponding to the attention head 722b is "1." In general, if there are N code vectors (where N can be 64, 512, 1024, etc.), the index range for the code vectors can be defined as [0, (N−1)]. Correspondingly, the memcode for each attention head is a number in the range [0, (N−1)].

Prior to commencing a video conference, when the subject-specific decoder models of one or more participants are distributed to other participants, those participants obtain one or more sets of code vectors, where the vectors in a particular set are customized for a particular participant. When the video conference commences, when a local participant speaks, the subject-specific encoder corresponding to the local participant need not transmit a video compressed using a conventional, standardized technique. In fact, the subject-specific encoder need not even transmit the fully encoded values or the code vectors derived during encoding. Rather, the subject-specific encoder can transmit only an index to the code vector, i.e., the memcode identifying the selected code vector.

Thus, in the foregoing example, only the memcodes "0" and "1" would be transmitted, representing the first and second attention heads $722a$, $722b$, respectively. In general, in different examples of autoencoders similar to the autoencoder 700, the respective numbers of memcodes transmitted are equal to the respective numbers of attention heads used in such autoencoders. Since this number is small, e.g., less than 5, 10, 20, etc., the transmission of the memcodes and not the encoding vectors themselves, can result in significant video compression at a compression ratio of about 800 (within a tolerance of 5%, 10%, etc.) or even more.

The encoded/compressed video corresponding to the local participant, that includes memcodes, is received on the device of a remote participant. A subject-specific decoder associated with the local participant is selected, as described above with reference to FIGS. 3A, 3B, and 5. Using the memcodes received while the conference is on-going, and the set of code vectors that are customized for the local participant and is received as part of the decoder model associated with the local participant, code vectors selected by the encoder can be retrieved for each attention head in a frame. Using these code vectors, video frames displaying the local participant speaking can be reconstructed by a decoder that corresponds to the local participant and that is available at the remote participant's device.

Referring again to FIG. 7A, the decoding stage 708 of the autoencoder 700 mirrors the encoding stage 704, and reconstructs frames of video using the memcodes produced by the encoding stage 704 and the set of code vectors. In particular, the decoding stage 708 includes two hidden layers 726, 728. The first hidden layer 726 includes a decompression or up-sampling module 730 and a rendering module 732 that may perform de-convolution. The second hidden layer 728 includes a decompression or up-sampling module 734 and a rendering module 736 that may also perform deconvolution, to provide a reconstructed frame.

The memcodes generated by the code stage 706 are provided as the encoded, compressed output 738 of the autoencoder 700. During the training mode and, optionally, during actual use as well, reconstructed frames generated by the decoding stage 708 are compared with the corresponding input, i.e., the unencoded, uncompressed frames using a loss module 740, to compute a reconstruction loss. In some examples, the reconstruction loss is computed as an aggregate (e.g., an average, a weighted average, sum, etc.) of the differences between the corresponding unencoded and reconstructed frames. If the loss is greater than or equal to a specified loss threshold, one or more parameters of the autoencoder 700, e.g., the coefficients of one or more kernels, etc. are adjusted until the reconstruction loss is less than the specified loss threshold. As described above with reference to FIG. 2, the reconstruction loss is computed in both the learning phase and the verification phase. The autoencoder 700 is determined to be fully trained when the reconstruction loss computed during the verification phase is less than loss threshold, which may be based on the test-error threshold.

In one example, the loss module 740 includes an adversarial network. An adversarial network is a type of an ANN that generally operates as a classifier, where similar inputs are grouped into the same class, and different inputs are designated to different classes. The similarity of the inputs is determined according to a suitable measure, such as a simple difference function, a weighted difference function, etc. When the loss module 736 includes an adversarial network, it attempts to classify an unencoded frame and the reconstructed frame. If the adversarial network classifies these two frames into two different classes, it is determined that the reconstructed frame is not similar to the unencoded frame. The training of the autoencoder 700 is continued if for a number of pairs of unencoded and corresponding reconstructed frames the adversarial network classifies the frames of the pairs into two different classes. For a number of such pairs, if the adversarial network designates the unencoded and the corresponding reconstructed frames to the same class, it is determined that the two corresponding frames are similar, and further, that the autoencoder 700 is fully trained.

Figure 7B:
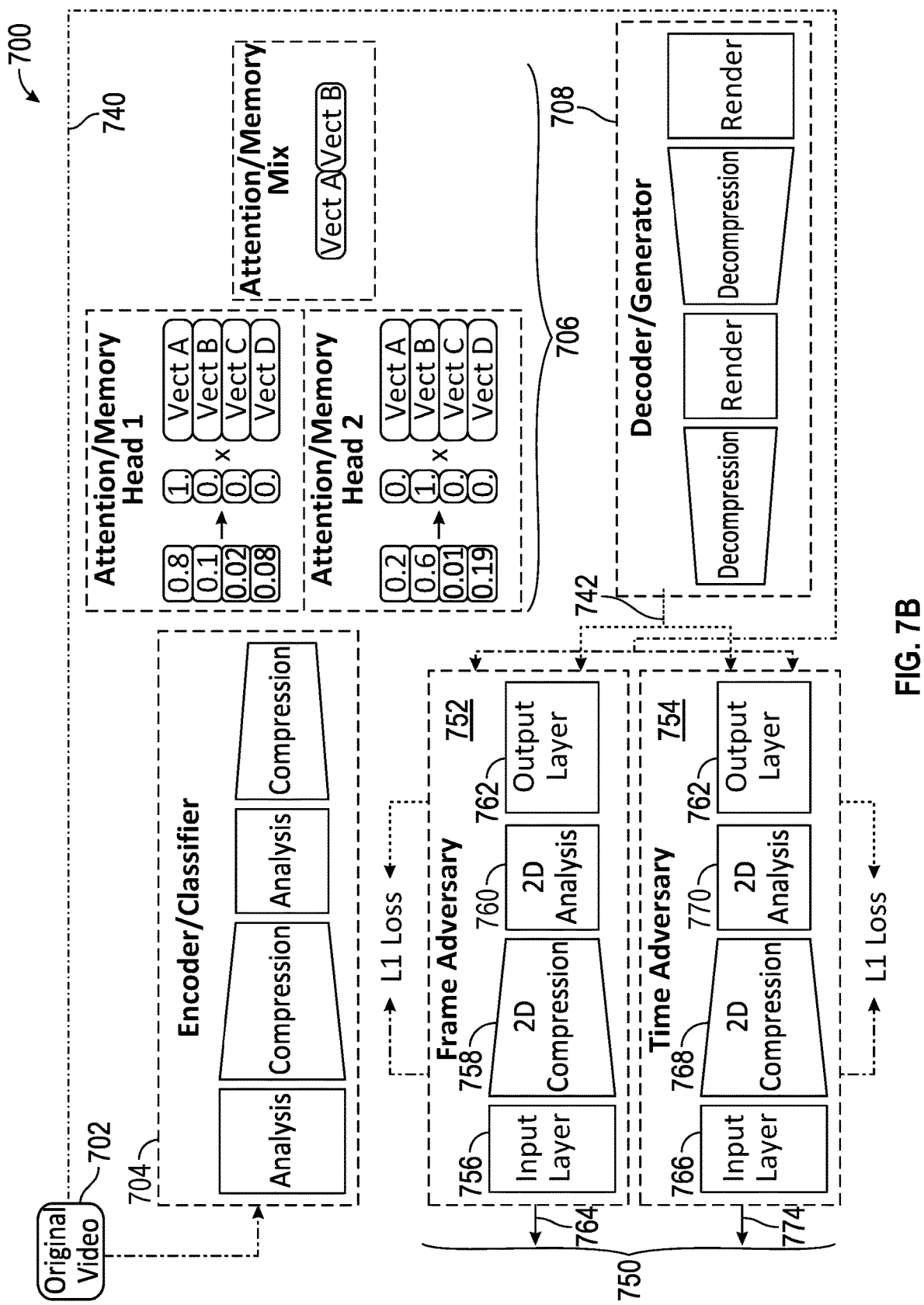
FIG. 7B schematically depicts the autoencoder shown in FIG. 7A in combination with an adversarial network used in training of the autoencoder, according to one example.

FIG. 7B illustrates one example of the use of an adversarial network in combination with the autoencoder 700. The autoencoder 700 receives original video frames 702 and produces memcodes 738. In addition, the decoding stage 708 of the autoencoder 700 produces reconstructed video frames 742. Both the original video frames 702 and the reconstructed video frames 742 are supplied to an adversarial network 750. The adversarial network 750 includes a frame adversary module 752 and a time adversary module 754. In some examples, an adversarial network may include only one of the two modules 752, 754.

In the frame adversary module 752, an input layer 756 represents pixels of a single frame of the original video frames 702 and pixels of a single reconstructed video frame from the reconstructed video frames 742. The 2D compression module 758 performs a down-sampling convolution (e.g., strided convolution), and the down-sampled output is convolved further (e.g., using non-strided convolution) in a 2D analysis module 760. The output 762 of the 2D analysis module 760 is a discrimination or classification of the single frame of the original video 702 and the single frame of the reconstructed video 742, which may correspond to the single frame of the original video 702.

The frame classification output 764 is a probabilistic representation of the discrimination/classification output 762, indicating whether the frame adversary module 752 has determined that the two frames it processed are the same as or similar to each other, or are two different frames. The probability that the two frames are the same/similar or different is also designated as a loss function L1 loss, which can be used to control the training of both the autoencoder 700 and the adversary network 750. In particular, if the frame adversary module 752 determines that the two frames that are compared are different (e.g., as indicated by the same/similar class probability of less than 0.5), when it is known that the two frames do correspond to each other, this information can be used to adjust one or more parameters of the autoencoder 700. Conversely, if the frame adversary module 752 determines that the two frames that are compared are the same/similar (e.g., as indicated by the same/similar class probability of greater than or equal to 0.5), when it is known that the two frames do not correspond to each other, this information can be used to adjust one or more parameters of the frame adversary module 752.

The time adversary module 754 is similar to the frame adversary module 752 in its function but, instead of comparing pairs of single frames, the time adversary module compares two sequences of frames (e.g., 2, 16, 24, 32 frames, etc.) corresponding to a certain time window of a pre-selected duration, e.g., a few milliseconds, a fraction of a second, etc. In particular, in the time adversary module 754, an input layer 766 represents pixels of a sequence of frames of the original video frames 702, and pixels of a sequence of reconstructed video frames from the reconstructed video frames 742.

The 3D compression module 768 performs a down-sampling convolution (e.g., strided convolution), and the down-sampled output is convolved further (e.g., using non-strided convolution) in a 3D analysis module 770. The output 772 of the 3D analysis module 770 is a discrimination or classification of the sequence of frames of the original video 702 and the sequence of frames of the reconstructed video 742, which may correspond to the sequence of frames of the original video 702.

Like the frame discrimination output 764, the time classification output 774 is a probabilistic representation of the discrimination/classification output 772, indicating whether the time adversary module 754 has determined that the two sequences of frames that it processed are the same as or similar to each other, or are two different sequences of frames. The probability that the two frame sequences are the same/similar or different is also designated as another loss function L1 loss, which can also be used to control the training of both the autoencoder 700 and the adversary network 750.

In particular, if the time adversary module 754 determines that two frame sequences that are compared are different (e.g., as indicated by the same/similar class probability of less than 0.5), when it is known that the two frame sequences do correspond to each other, this information can be used to adjust one or more parameters of the autoencoder 700. Conversely, if the time adversary module 754 determines that two frame sequences that are compared are the same/similar (e.g., as indicated by the same/similar class probability of greater than or equal to 0.5), when it is known that the two frame sequences do not correspond to each other, this information can be used to adjust one or more parameters of the time adversary module 754.

When the autoencoder 700 is determined to be fully trained, the encoding stage 704 and the code stage 706 together may function as a subject-specific encoder for the participant for whom the autoencoder was trained. The decoding stage 708 may function as a subject-specific decoder for that participant.

The subject-specific encoders and decoders describes above are based on deep neural networks, advantageously, but not necessarily employing autoencoders trained using adversarial networks, to compress raw video into discrete memory table indices referred to as memcodes. The encoded, compressed video may include the memcodes, so as to achieve a high compression ratio, and the decoder can reconstruct video frames for rendering using the memcodes, and subject-specific code vectors. An ML system can be trained to down-sample raw video into a smaller number of discrete memcodes, and to reconstruct the video from the memcodes.

The encoding and compression and decoding/reconstruction techniques described herein can be used in various applications as described above. In addition to traditional video conference and merchant live e-commerce, techniques described herein can be used for object detection and remote AI inferencing for delivery drones for example. A package drone device may include the ML system such that video taken by the drone includes memcodes that are compressed and sent to video conferencing server for inferring a particular object. Such a configuration could help conserve power for the drone and provide high accuracy for autonomous (or remote piloted by human) drones to deliver items for merchants. Additionally, memcodes may be calculated using a camera of a merchant's device and sent to the video conferencing server for facial detection and identifying an in-store shopper such that payment can be completed without having to interact with a POS system (e.g., pay with face).

Various examples of subject-specific encoders and decoders described herein feature better compression ratios than the state of the art standardized video encoders and decoders without incurring a substantial degradation (e.g., 20%, 10%, 5%, 2%, 1%, etc.) in the perception quality of the reconstructed video. For example, a standardized encoder/decoder generally yields an average compression ratio of about 200 (within a tolerance of 5%, 10%, etc.) for video transmissions received from a content provider such as movie or TV show streaming service. This compression ratio is usually adequate when buffering is available, i.e., in the case of transmission of stored video, but it is generally not adequate, and can lead to information loss, when buffering is not available, e.g., as in live streaming. A subject-specific encoder/decoder pair according to one example yielded a compression ratio of about 800 (within a tolerance of 5%, 10%, etc.) for video transmissions from an individual for whom the subject-specific encoder/decoder were trained. This compression ratio is generally sufficient to deliver high-definition video even when buffering is unavailable.

Experiments indicated that although the encoders and decoders according to some examples are customized for a particular subject/individual, the presence of other individuals, such as a child walking by, or animals, such as dog, did not degrade the perception quality of the reconstructed video substantially (e.g., more than 30%, 20%, 10%, 5%, etc.). In some cases, the perception quality can degrade and, as such, a quality check is performed in some examples.

Specifically, in some examples, video frames encoded using a subject-specific encoder are decoded, either at the user device or at a video conference server, to obtain an ML-based reconstructed video. At the user device, the difference between the video input to the subject-specific encoder and the ML-based reconstructed video may be used to determine whether the perception quality of the ML-based reconstructed video is at least equal to a specified threshold. The presence of other people, animals, etc., can degrade the perception quality. If the perception quality falls below the specified threshold, the device may switch encoding from subject-specific encoding to standardized encoding. This test can be repeated after a certain preset time, e.g., after a few seconds, a few minutes, etc., and the device may switch encoding back to the subject-specific encoding, if the perception quality has improved and is at least equal to the specified threshold.

The server may also determine whether the perception quality of the ML-based reconstructed video falls below the specified threshold. To make this determination, the server may request from the user device the video input to the subject-specific encoder at the user device, in addition to the video encoded by the subject-specific encoder.

In a typical video conference setting (or even in a news broadcast), usually one individual speaks, and the background is relatively static, i.e., portions of frames other than those representing the speaker generally do not change. In situations such as these, a video conferencing system employing subject-specific encoders and decoders can facilitate transmission and rendering of videos having a high perception quality even when buffering is not available and the available bandwidth is low. Compared to using standardized encoders/decoders, such a system can provide a higher quality, more immersive video conferencing experience.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

We claim:

1. A computer-implemented method, comprising:
    receiving a set of original video frames comprising images of a user;
    dividing the set of original video frames into a training subset and a test subset wherein the test subset includes one or more sets of reconstructed frames;
    training a machine learning (ML) module using the training subset until a training error is less than a specified training threshold, to obtain a first encoding model that is customized to the user based at least in part on the training subset, a first decoding model that is customized to the user based at least in part on the training subset, one or more second encoding models that are customized to one or more other users, and one or more second decoding models that are customized to the one or more other users;
    confirming using the test subset that a test error is less than a specified test threshold, wherein the test error is obtained using an adversarial network, wherein the adversarial network classifies one or more pairs of frames, wherein an individual pair of the one or more pairs comprises: (i) a first frame of the set of original video frames from the training subset, and (ii) a second frame of the set of original video frames from the test subset, and wherein the test error is based at least in part on a probability that the frames of the individual pair belong to a same or similar class; and
    upon confirming that the test error is less than the specified test threshold, transmitting: (i) the first encoding model and the one or more second encoding models to a user device used by the user or to a video-conferencing server, and (ii) the first decoding model and the one or more second decoding models to the video-conferencing server or to one or more other user devices.

2. The computer-implemented method of claim 1, wherein the set of original video frames comprises: (i) raw, unencoded video frames obtained from a camera, or (ii) encoded video frames obtained from a standardized video encoder.

3. The computer-implemented method of claim 1, wherein each step of the method is performed at the user device used by the user or at the video-conferencing server.

4. The computer-implemented method of claim 1, wherein the first decoding model comprises configuration of a decoding stage of an autoencoder.

5. The computer-implemented method of claim 1, wherein the machine learning comprises training of an autoencoder using video obtained from the user or the one or more other users.

6. The computer-implemented method of claim 1, wherein the probability is determined according to a simple difference function or a weighted difference function.

7. The computer-implemented method of claim 1, wherein the set of original video frames comprise encoded video frames obtained from a standardized video encoder, wherein the encoded video frames include memcodes, and wherein the first decoding model reconstructs video frames using the memcodes and subject-specific code vectors.

8. A system comprising:
a processor; and
a memory in communication with the processor and comprising instructions which, when executed by the processor, program the processor to:
receive a set of original video frames comprising images of a user;
divide the set of original video frames into a training subset and a test subset, wherein the test subset includes one or more sets of reconstructed frames;
train a machine learning (ML) module using the training subset until a training error is less than a specified training threshold, to obtain a first encoding model that is customized to the user based at least in part on the training subset, a first decoding model that is customized to the user based at least in part on the training subset, a second encoding model that is customized to a second user, and a second decoding model that is customized to the second user;
confirm using the test subset that a test error is less than a specified test threshold, wherein the test error is obtained using an adversarial network, wherein the adversarial network classifies one or more pairs of frames, wherein an individual pair of the one or more pairs of frames comprises: (i) a first frame of the set of original video frames from the training subset, and (ii) a second frame of the set of original video frames from the test subset, and wherein the test error is based at least in part on a probability that the frames of the individual pair belong to a same or similar class; and
upon confirming that the test error is less than the specified test threshold, transmit: (i) the first encoding model or the second encoding model to a user device used by the user or to a video-conferencing server, and (ii) the first decoding model or the second decoding model to the video-conferencing server or to one or more other user devices.

9. The system of claim 8, wherein the set of original video frames comprises: (i) raw, unencoded video frames obtained from a camera, or (ii) encoded video frames obtained from a standardized video encoder.

10. The system of claim 8, wherein each step is performed at the user device used by the user or at the video-conferencing server.

11. The system of claim 8, wherein the first decoding model comprises configuration of a decoding stage of an autoencoder.

12. The system of claim 8, wherein the machine learning comprises training of an autoencoder using video obtained from the second user.

13. The system of claim 8, wherein the probability is determined according to a simple difference function or a weighted difference function.

14. One or more non-transitory computer-readable media storing computer-executable instructions that, when executed by one or more processors, cause the one or more processors to perform operations comprising:
receiving a set of original video frames comprising images of a user;
dividing the set of original video frames into a training subset and a test subset wherein the test subset includes one or more sets of reconstructed frames;
training a machine learning (ML) module using the training subset until a training error is less than a specified training threshold, to obtain a first encoding model that is customized to the user based at least in part on the training subset, a first decoding model that is customized to the user based at least in part on the training subset, a second encoding model that is customized to a second user, and a second decoding model that are customized to the second user;
confirming using the test subset that a test error is less than a specified test threshold, wherein the test error is obtained using an adversarial network, wherein the adversarial network classifies one or more pairs of frame sequences, wherein an individual pair of the one or more pairs of frame sequences comprises: (i) a first frame sequence of the set of original video frames from the training subset, and (ii) a second frame sequence of the set of original video frames from the test subset, and wherein the test error is based at least in part on a probability that a majority of frames from the individual pair belong to a same or similar class; and
upon confirming that the test error is less than the specified test threshold, transmitting: (i) the first encoding model or the second encoding model to a user device used by the user or to a video-conferencing server, and (ii) the first decoding model or the second decoding model to the video-conferencing server or to one or more other user devices.

15. The one or more non-transitory computer-readable media of claim 14, wherein the set of original video frames comprises: (i) raw, unencoded video frames obtained from a camera, or (ii) encoded video frames obtained from a standardized video encoder.

16. The one or more non-transitory computer-readable media of claim 14, wherein each step is performed at the user device used by the user or at the video-conferencing server.

17. The one or more non-transitory computer-readable media of claim 14, wherein the first decoding model comprises configuration of a decoding stage of an autoencoder.

18. The one or more non-transitory computer-readable media of claim 14, wherein the machine learning comprises training of an autoencoder using video obtained from the second user.

19. The one or more non-transitory computer-readable media of claim 14, wherein the probability is determined according to a simple difference function or a weighted difference function.

20. The one or more non-transitory computer-readable media of claim 14, wherein the frame sequences correspond to a pre-determined time window.

* * * * *